US007881757B2

(12) United States Patent
Mizuta

(10) Patent No.: US 7,881,757 B2
(45) Date of Patent: Feb. 1, 2011

(54) POWER MANAGEMENT METHOD OF WIRELESS NODES

(75) Inventor: Takashi Mizuta, Osaka (JP)

(73) Assignee: Panasonic Corporation, Osaka (JP)

( * ) Notice: Subject to any disclaimer, the term of this patent is extended or adjusted under 35 U.S.C. 154(b) by 776 days.

(21) Appl. No.: 11/792,753

(22) PCT Filed: Nov. 14, 2005

(86) PCT No.: PCT/JP2005/020861

§ 371 (c)(1),
(2), (4) Date: Jun. 11, 2007

(87) PCT Pub. No.: WO2006/067922

PCT Pub. Date: Jun. 29, 2006

(65) Prior Publication Data

US 2008/0151801 A1 Jun. 26, 2008

(30) Foreign Application Priority Data

Dec. 21, 2004 (JP) ............................ 2004-369056

(51) Int. Cl.
*H04W 72/00* (2009.01)
*H04B 7/00* (2006.01)
*H04B 1/38* (2006.01)

(52) U.S. Cl. ....................... 455/574; 455/519; 455/453; 455/41.2

(58) Field of Classification Search ......... 455/518–522, 455/574, 453, 41.2
See application file for complete search history.

(56) References Cited

U.S. PATENT DOCUMENTS 6,026,303 A 2/2000 Minamisawa (Continued)

FOREIGN PATENT DOCUMENTS

CN 1338844 3/2002

(Continued)

OTHER PUBLICATIONS

Supplementary European Search Report issued Oct. 27, 2009 in EP 05 80 6186.

(Continued)

*Primary Examiner*—Jinsong Hu
*Assistant Examiner*—Marisol Figueroa
(74) *Attorney, Agent, or Firm*—Wenderoth, Lind & Ponack, L.L.P.

(57) ABSTRACT

The invention comprises a step of constructing a plurality of groups using a plurality of wireless nodes during construction of a network; a step of provisionally deciding, from among the wireless nodes in each group, a group master node serving as a group master that communicates with the other nodes in the group and that functions as a communication relay station for communicating with the other groups, with the other nodes in the group serving as slave nodes that are connected under the control of the group master node to perform their respective terminal station operation; a step in which the wireless nodes in each group exchange data with each other at a commencement session and calculate the minimum required transmission power for each other; a step in which the wireless nodes in each group use the calculated minimum required transmission powers to communicate with each other; and a step of, when determining that the time of changing the group master has come, causing one of the slave nodes to take over the group master.

14 Claims, 25 Drawing Sheets

U.S. PATENT DOCUMENTS

| | | | | |
|---|---|---|---|---|
| 6,480,505 | B1 * | 11/2002 | Johansson et al. | 370/449 |
| 6,804,209 | B1 | 10/2004 | Sugaya et al. | |
| 6,859,656 | B2 | 2/2005 | Choi et al. | |
| 6,901,275 | B1 * | 5/2005 | Aoyagi | 455/574 |
| 6,934,554 | B2 | 8/2005 | Mizuno et al. | |
| 7,035,240 | B1 * | 4/2006 | Balakrishnan et al. | 370/338 |
| 7,594,010 | B2 * | 9/2009 | Dohler et al. | 709/224 |
| 2002/0022495 | A1 | 2/2002 | Choi et al. | |
| 2002/0082035 | A1 | 6/2002 | Aihara et al. | |
| 2002/0115458 | A1 | 8/2002 | Mizuno et al. | |
| 2002/0159401 | A1 | 10/2002 | Boger | |
| 2003/0060168 | A1 * | 3/2003 | Teibel | 455/69 |
| 2003/0195019 | A1 | 10/2003 | Litwin | |
| 2004/0199668 | A1 * | 10/2004 | Lin et al. | 709/241 |
| 2005/0014467 | A1 * | 1/2005 | Ishiwata et al. | 455/39 |
| 2005/0033816 | A1 * | 2/2005 | Yamaguchi et al. | 709/208 |

FOREIGN PATENT DOCUMENTS

| | | |
|---|---|---|
| EP | 1 176 762 | 1/2002 |
| JP | 2924828 | 5/1999 |
| JP | 2000-138685 | 5/2000 |
| JP | 2001-103570 | 4/2001 |
| JP | 2002-152216 | 5/2002 |
| JP | 2002-325273 | 11/2002 |
| JP | 2003-188886 | 7/2003 |
| WO | 03/007552 | 1/2003 |
| WO | 03/084160 | 10/2003 |
| WO | 2004/109996 | 12/2004 |

OTHER PUBLICATIONS

Kwon, T. et al., *Clustering with Power Control, IEEE*, vol. 2 (Oct. 31, 1999), pp. 1424-1428.

European Office Action issued Jun. 10, 2010 in corresponding European Application No. 05 806 186 2.

* cited by examiner

POWER MANAGEMENT METHOD OF WIRELESS NODES

TECHNICAL FIELD

The present invention relates to an interactive wireless communication network system comprising a plurality of wireless nodes (wireless transmitters/receivers); more particularly, it relates to a power management method for managing power consumption of battery-driven wireless nodes, and a network system therefor.

BACKGROUND ART

An interactive wireless communication network system includes a host unit for collecting information and a plurality of wireless nodes, and the wireless nodes in particular comprise a master unit for performing overall network processing among a group of wireless nodes, and a plurality of slave units dependent thereupon. With such a wireless node configuration, the master unit establishes an ad-hoc network with each slave unit as necessary to perform interactive wireless communication with each slave unit, and performs interactive communication with the host unit representing the wireless node group. Thus, the master unit collects information from the slave units, and performs transmission to the host unit representing the slave units, thereby reducing the load on the slave units, and enabling the slave units to be configured at low cost and in a simplified manner. However, with this method, because processes are concentrated in a single master unit, and the traffic volume of transmission/reception in the master unit is exceedingly large compared to the slave units, if there is shortage in the remaining power of a battery serving as a power source for the master unit, problems occur such as slowdown of the entire network due to master unit transmission/reception output shortage, or at worst, disconnection of the communication circuit due to master unit battery rundown. Therefore, power management of the wireless nodes has been essential.

Thus, there has been a conventional power management method for wireless nodes such as the invention of patent document 1. FIG. 24 is a constitutional diagram of a conventional power management method for wireless nodes described in patent document 1. The system shown in FIG. 24 is an interactive wireless communication network comprising a plurality of wireless nodes 2401, host unit 2402, and gateway unit 2403 serving as relay between the host unit and wireless nodes, wherein the wireless node that initially sends a transmission request serves as a provisional master unit 2404 that is a provisional master wireless node, and other wireless nodes serve as slave units 2405, and interactive communications between the provisional master unit 2404 and each slave unit 2405 commence. Thereafter, the provisional master unit 2404 collects battery power data of all the slave units, reselects in accordance with the collected data a slave unit with the best operating conditions to be an actual master unit 2406 to serve as an actual master wireless node, and switches to interactive wireless communication between the actual master unit 2406 serving as a hub and each slave unit so that the actual master unit 2406 performs interactive wireless communication with the host unit 2402 via the gateway unit 2403. Thereafter, an actual master unit is periodically reselected in the same manner, thereby allowing selection of an appropriate wireless node as a master unit that is less susceptible to battery rundown.

Patent Document 1: Laid-open Japanese Patent No. H10-145276

However, with such a conventional constitution as described above, the more slave units there are, the less opportunity each slave unit has to be selected as an actual master unit. This leads to the problem that the effect of eliminating imbalances in power consumption by having slave units with excess battery power switch to serve as an actual master unit is not fully and efficiently demonstrated.

Further, because in such a constitution an actual master unit is selected from among all the slave units, in a case where wireless nodes are distributed across a wide range, the average wireless communication distance between the actual master unit and slave units becomes longer and the power consumption for the entire network required for wireless transmission increases, so that on average any wireless node is likely to experience battery rundown at an early stage.

Further, in a case where a slave unit is outside the radio wave range given the transmission power of the selected actual master unit, such slave unit needs to be separated from the network even when it has sufficient battery power, or the actual master unit and slave units need to be physically moved each time to a location where reception can be obtained, resulting in the problem of considerably degraded network performance and convenience.

The present invention was conceived with a view toward solving such conventional problems, and its object is to provide an interactive wireless communication network comprising a plurality of wireless nodes, wherein imbalance in power consumption of the wireless nodes is efficiently prevented, power consumption of the entire network is reduced to prolong average battery life, thus enabling interactive wireless communication to be always available between master unit and slave units.

DISCLOSURE OF THE INVENTION

The power management method relating to the present invention is a power management method for managing power consumption of a battery that serves as a power source for a wireless node in an interactive wireless communication network system including a plurality of wireless nodes, comprising: a step of constructing plurality of groups using a plurality of wireless nodes during construction of a network; a step of provisionally deciding, from among the wireless nodes in each group, a group master node serving as a group master that communicates with the other nodes in the group and that functions as a communication relay station for communicating with the other groups, with the other nodes in the group serving as slave nodes that are connected under the control of the group master node to perform their respective terminal station operation; a step in which the wireless nodes in each group exchange data with each other at a commencement session and calculate the minimum required transmission power for each other; a step in which the wireless nodes in each group use the calculated minimum required transmission powers to communicate with each other; and a step of, when determining that the time of changing the group master has come, causing one of the slave nodes to take over the group master.

With such a constitution, a plurality of relatively small wireless ad-hoc network groups can be formed from a plurality of wireless nodes, the group master node serving as a master unit of a group performs interactive wireless communication with slave nodes serving as slave units and interactive wireless communication with group master nodes of other groups, each wireless node in a group performs interactive wireless communication with other wireless nodes in the same group at the minimum required transmission power, and group master rotation is periodically performed within a group.

As used herein, group master node means a wireless node that operates as a communication relay station in a wireless communication network made up of a group of wireless nodes, and a slave node means a wireless node connected under the group master node and operating as a terminal station.

The constitution may further comprise a step for causing the group master node to monitor volume of communication traffic in the communication with the slave nodes in the group, and when the volume of communication traffic of the group master node has reached a pre-set communication traffic volume, group master rotation is performed with the slave node having the smallest communication traffic volume.

With the present constitution, group master rotation timing can be accurately detected based on communication traffic volume, which has a high correlation with wireless node power consumption.

The constitution may also further comprise a step for causing a slave node to monitor its own communication traffic volume and report such communication traffic volume to the group master node, and when a prescribed time has passed since the current group master node started the group master role, group master rotation is performed with the slave node having the smallest communication traffic volume.

The constitution may also further comprise a step for causing the group master node to calculate average communication traffic volume of the wireless nodes in the group and exchange average communication traffic volume information with other group masters; a step for absorbing and merging a group in which the average communication traffic volume exceeds a pre-set level into the adjacent group having the lowest average communication traffic volume; and a step for dividing the group after group absorption and merger so that the each average communication traffic volume is equalized.

The constitution may also further comprise a step for causing the group master node to exchange the slave node having the greatest communication traffic volume in the group with a wireless node having the smallest communication traffic volume in an adjacent group.

The constitution may further comprise a step for causing each slave node to monitor its own battery power and report the battery power to the group master node, and when a prescribed time has passed since the current group master node started the group master role, group master rotation is performed with a slave node having the greatest remaining battery power.

With the present configuration, group master rotation timing can be accurately detected based on battery power itself.

Here, the constitution may further comprise a step for causing the group master node to calculate the average remaining battery power of the wireless nodes in the group and exchange average remaining battery power information with other group masters; a step for absorbing and merging a group in which the average remaining battery power is lower than a pre-set level into the adjacent group having the greatest average remaining battery power; and a step for dividing the group after group absorption and merger so that the each average remaining battery power is equalized.

With the present constitution, if there is an imbalance in the average remaining battery power among groups, a plurality of groups having a large imbalance in average remaining battery power are combined and then divided again, thereby reducing imbalance in average remaining battery power.

The constitution may further comprise a step for causing the group master node to exchange a slave node having the lowest remaining battery power in the group with a wireless node in an adjacent or near group having the greatest remaining battery power.

With the present constitution, if there is an excessive imbalance such that the imbalance cannot be sufficiently extinguished just by intra-group group master rotation, wireless node exchange is carried out with another group, thereby eliminating such imbalance.

The constitution may further comprise a step for, if the battery power of a slave node having the lowest remaining battery power in a group is lower than a pre-set level, separating such slave node having the lowest remaining battery power from the group.

With the present constitution, if there is a wireless node with extremely low battery power even after intra-group group master rotation, merging of groups, or inter-group wireless node exchange, such wireless node is forcibly separated from the group, thereby avoiding network problems caused by wireless node malfunction due to power exhaustion.

The constitution may further comprise a step for causing a group master node to monitor the retransmission frequency occurring in communications with each slave node, and when a prescribed time has passed since the current group master node started the group master role, group master rotation is performed with the slave node having the lowest retransmission frequency.

With the present constitution, group master rotation timing can be accurately detected based on communication retransmission frequency, which has a high correlation with wireless node battery consumption.

The constitution may further comprise a step for causing a group master node to calculate average retransmission frequency occurring in communications with each wireless node in the group and to exchange the average retransmission frequency information with other group masters; a step for absorbing and merging a group in which the average retransmission frequency exceeds a pre-set level into the adjacent group having the lowest average retransmission frequency; and a step for dividing the group after group absorption and merger so that each average retransmission frequency is equalized.

With the present constitution, based on communication retransmission frequency, which has a high correlation with wireless node battery consumption, if there is an imbalance among the groups in group average retransmission frequency, a plurality of groups having a large imbalance in average retransmission frequency are merged and then divided again, thereby eliminating imbalance in average battery consumption.

The constitution may further comprise a step for causing a group master node to exchange the slave node having the greatest retransmission frequency in the group with the wireless node in an adjacent or near group having the lowest retransmission frequency.

With the present constitution, based on communication retransmission frequency, which has a high correlation with wireless node battery consumption, if there an extreme imbalance in the retransmission frequencies of wireless nodes that cannot be sufficiently eliminated just by intra-group group master rotation, wireless node exchange is carried out with another group, thereby eliminating such imbalance.

The constitution may further comprise a step for, when the retransmission frequency of a slave node having the greatest retransmission frequency in a group exceeds a pre-set level, separating the slave node having the greatest retransmission frequency from the group.

With the present constitution, if there is a wireless node having an extremely large number of retransmissions even after intra-group group master rotation, merging of groups, or inter-group wireless node exchange, such wireless node is forcibly separated from the group, thereby avoiding network problems caused by wireless node malfunction due to power exhaustion.

The constitution may further comprise a step for causing a group master node to monitor the bit error rate occurring in communications with each slave node, and when a prescribed time has passed since the current group master node started its role as group master, group master rotation is performed with the slave node having the lowest bit error rate.

With the present constitution, group master rotation timing can be accurately detected based on bit error rate, which has a high correlation with wireless node battery consumption.

The constitution may further comprise a step for causing a group master node to calculate the average bit error rate occurring in communications with each wireless node in the group and to exchange average bit error rate information with other group masters; a step for absorbing and merging a group in which the average bit error rate exceeds a pre-set level into the adjacent group having the lowest average bit error rate; and a step for dividing the group after group absorption and merger so that the each average bit error rate is equalized.

With the present constitution, based on the bit error rate, which has a high correlation with wireless node power consumption, if there is an imbalance among the groups in the group average bit error rate, a plurality of groups having a large disparity in average bit error rate are merged and then divided again, thereby eliminating imbalance in average bit error rate.

The constitution may further comprise a step for causing a group master node to exchange the slave node having the highest bit error rate in the group with the wireless node having the lowest bit error rate in adjacent groups.

With the present constitution, based on the bit error rate, which has a high correlation with wireless node battery consumption, if there is an extreme imbalance such that imbalance in bit error rate of wireless nodes cannot be sufficiently eliminated just by intra-group group master rotation, wireless nodes are exchanged between groups, thereby eliminating such imbalance.

The constitution may further comprise a step for, when the retransmission frequency of the slave node having the highest bit error rate in the group exceeds a pre-set level, separating the slave node having the highest bit error rate from the group.

With the present constitution, if there is a wireless node having an extremely serious bit error rate even after intra-group group master rotation, merging of groups, or inter-group wireless node exchange, such wireless node is forcibly separated from the group, thereby avoiding network problems caused by wireless node malfunction due to power exhaustion.

A power management device relating to the present invention is a power management device for managing power consumption of a battery that serves as a power source for a wireless node in an interactive wireless communication network system including a plurality of wireless nodes, comprising: a group creation unit that causes a wireless node to belong to any one of a plurality of groups comprising a plurality of wireless nodes formed during construction of network and to communicate with the other nodes, and in cases where in its own group there is no group master node for performing the role of group master node serving as a communication relay station for communicating with the other nodes in the group and communicating with other groups, to serve as a provisional group master node, and in cases where there is a group master in its own group, to serve as a slave node connected under the group master node and operate as a terminal station; a master operation unit that, in a case where the node serves as a group master node, causes the node to communicate with other slave nodes in the group, and serve as a communication relay station for communicating with other groups; a rotation controller that, in a case where the node serves as a group master node, periodically determines at prescribed intervals whether time for group master rotation has come, and if determination is made that time for group master rotation has come, makes a rotation request for group master role rotation to one of the slave nodes; and a slave operation unit that, in a case where the node serves as a slave node, transmits to the group master of its own group information necessary for determining whether time for group master role rotation has come, and receives rotation requests from the group master node and shifts to the operation of the master operation unit.

With the present invention, a plurality of relatively small wireless ad-hoc network groups are formed from a plurality of wireless nodes, the group master node serving as a master unit in the group performs interactive wireless communication with slave nodes that serve as slave units and performs interactive wireless communication with group master nodes of other groups as well, wireless nodes in the group perform interactive wireless communication with other wireless nodes in the same group at the minimum required transmission power, and intra-group group master rotation is periodically performed.

A program for power management method relating to the present invention is a program for the power management method for managing power consumption of batteries that serves as power source for wireless nodes in an interactive wireless communication network system comprising a plurality of wireless nodes, such method comprising; a step of constructing a plurality of groups using a plurality of wireless nodes during construction of a network; a step of provisionally deciding, from among the wireless nodes in each group, a group master node serving as a group master that communicates with the other nodes in the group and that functions as a communication relay station for communicating with the other groups, with the other nodes in the group serving as slave nodes that are connected under the control of the group master node to perform their respective terminal station operation; a step in which the wireless nodes in each group exchange data with each other at a commencement session and calculate the minimum required transmission power for each other; a step in which the wireless nodes in each group use the calculated minimum required transmission powers to communicate with each other; and a step of, when determining that the time of changing the group master has come, causing one of the slave nodes to take over the group master.

This program is executed on a device that includes a CPU, memory, various interfaces and the like, thereby causing a computer to function as a power management device. Further, included in the claims of the present invention are recording media containing such a program for such a power management method, including portable recording media such as CD-ROMs, flexible disks, optical disks, and memory cards, other recording devices provided at the end of a communication circuit, computer hard disks, RAM and the like. A program recorded on such recording media is executed on a device including a CPU, memory and the like, thus constituting a power management device.

The details of the present invention will be explained with reference to the following best modes to carry out the invention and the following drawings. The following is meant only to provide an example, and it is not intended for the present invention to be limited thereto.

BRIEF DESCRIPTION OF THE DRAWINGS

FIG. 1 (*b*) is a device block diagram of a wireless node in the first embodiment of the present invention;

FIG. 23 (*b*) is a required electrical power characteristics chart showing simulated topology effects of the present invention.

BEST MODE TO CARRY OUT THE INVENTION

An explanation will be given below for embodiments of the present invention with reference to the drawings.

First Embodiment

Figure 1A:
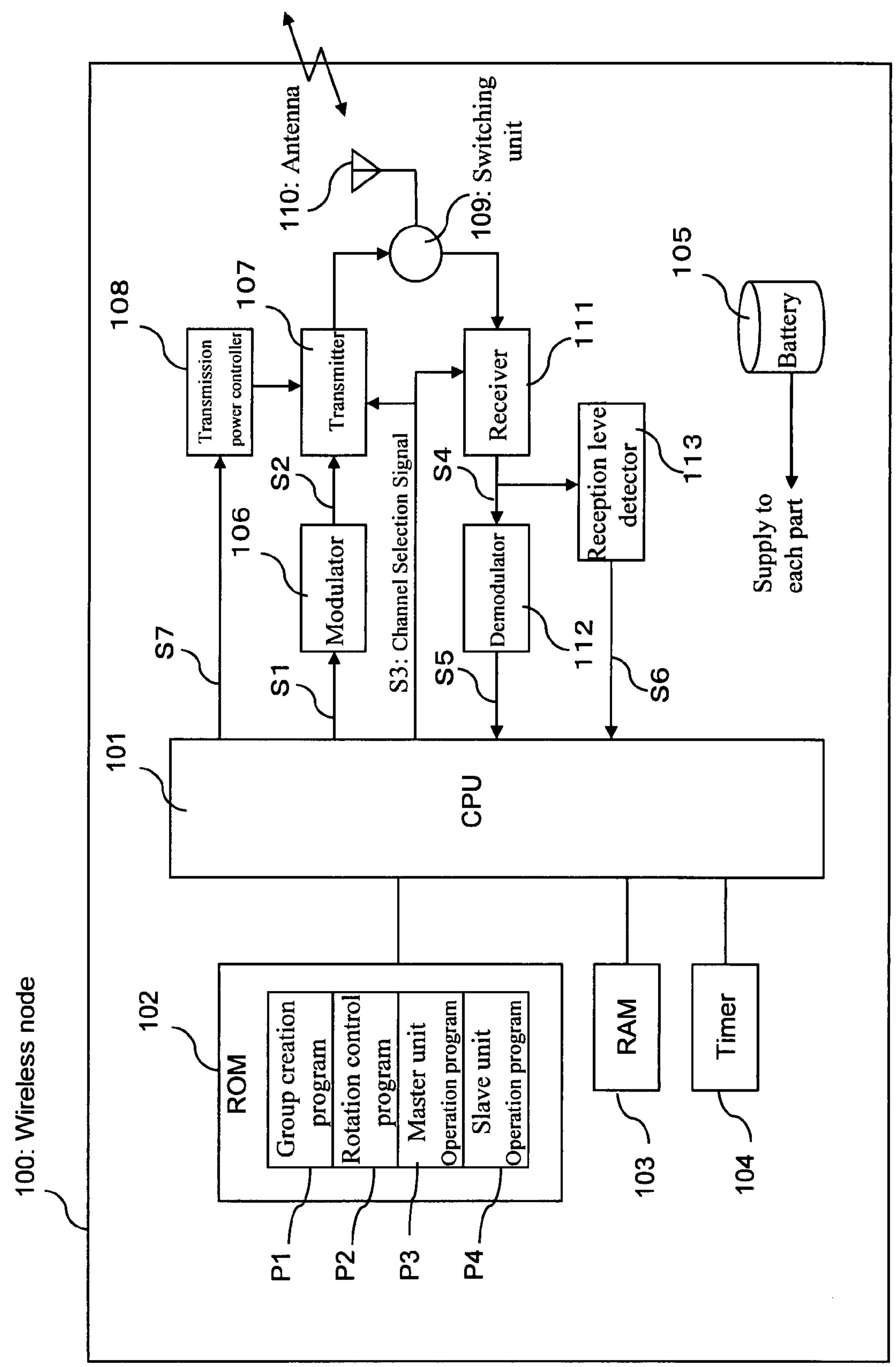
FIG. 1 (*a*) is a block diagram of a wireless node in a first embodiment of the present invention.
Figure 1B:
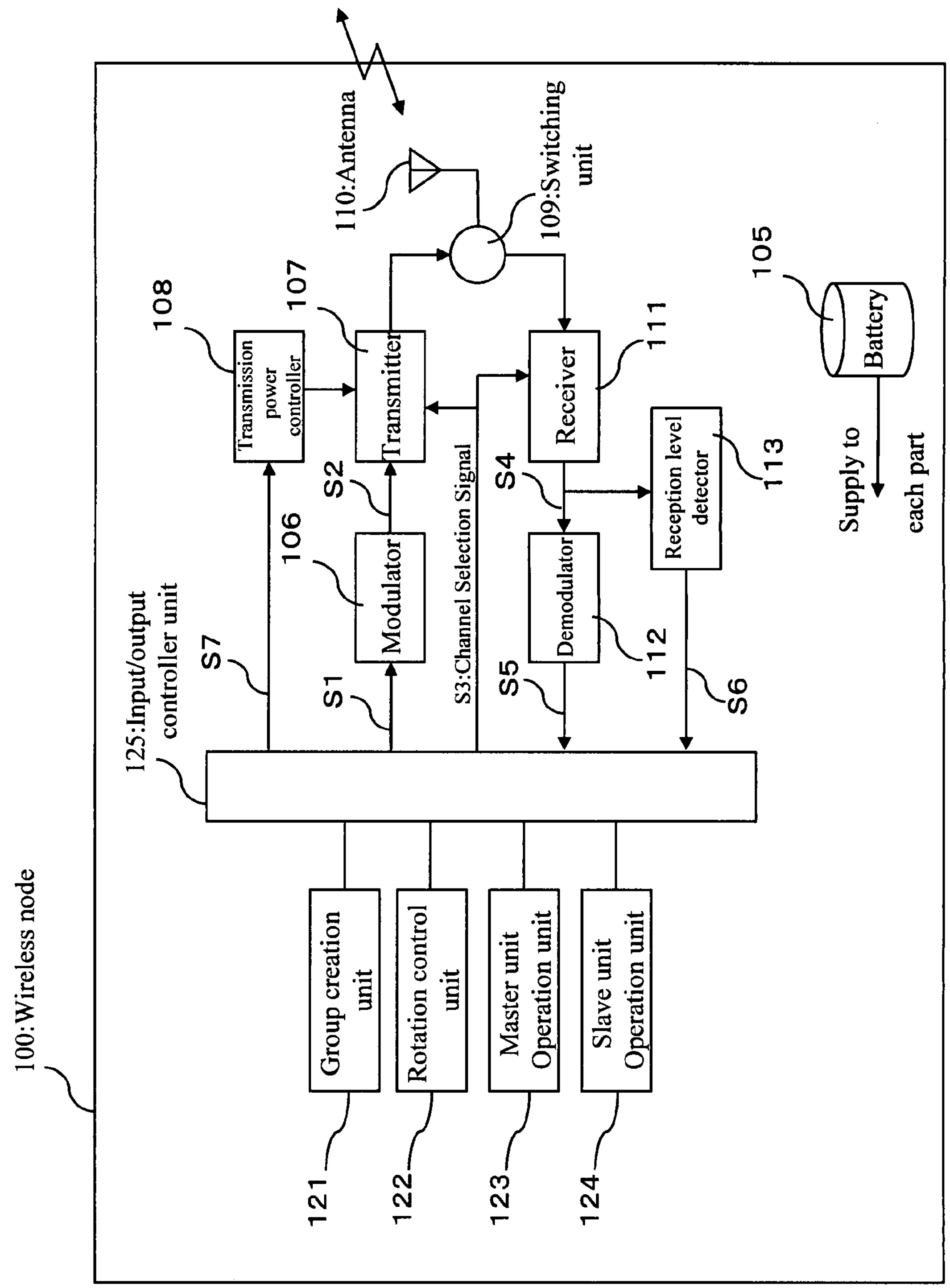

FIG. 1 (*a*) is a block diagram of a wireless node in the first embodiment of the present invention.

In FIG. 1 (*a*), a wireless node 100 comprises a CPU 101 for controlling the various units of the wireless node and processing transmission/reception data, a ROM 102 having programs stored therein, a RAM 103, a timer 104, a battery 105 for supplying power to each unit of the wireless node including the CPU 101, a modulator 106, a transmitter 107, a transmission power controller 108, a switching unit 109 for performing switching between transmission radio waves and reception radio waves, an antenna 110, a receiver 111, a demodulator 112, and a reception level detector 113.

When the wireless node 100 is to perform transmission, it does so as follows. The CPU 101 executes the necessary programs from among a group of programs included in the ROM 102 while using the RAM 103 as working memory, and creates transmission data S1. The transmission data S1 is modulated by the modulator 106 and converted into an IF signal S2, and the IF signal S2 is converted into high-frequency waves and power amplified by the transmitter 107. At this time, the transmission power controller 108 performs power control with respect to the transmitter 107 in accordance with a transmission power level S7 outputted from the CPU 101. The power amplified high-frequency signal is sent out to the antenna 110 by the switching unit 109, which is set in a transmission mode, and transmitted as a radio wave. At this time, a channel number is designated for the transmitter 107 by a channel selection signal S3 controlled by the CPU 101, and high-frequency conversion is performed at the frequency of the designated channel. Because each channel number has a different transmission frequency to be used, conflict among wireless nodes is avoided.

When the wireless node 100 is to perform reception, it does so as follows. Radio waves of other wireless nodes and other stations are received by the antenna 110, converted into high-frequency signals, and inputted into the receiver 111 by the switching unit 109, which is set in a reception mode. At the receiver 111 a channel number is designated by the channel selection signal S3 controlled by the CPU 101, tuning is performed at the frequency of the designated channel and an IF signal S4 is extracted. The IF signal S4 is demodulated by the demodulator 112, and reception data S5 is reproduced and inputted into the CPU 101. At the same time, the reception level of the IF signal S4 is always monitored by the reception level detector 113 so that a reception level S6 is inputted into the CPU 101 as a monitoring result. The reception level detector 113 is constituted by a detection circuit comprising, for example, a combination of a diode and amplifier and outputs an envelope signal of an IF signal as a reception level.

The CPU 101 adds error correcting codes to the transmission data S1 by software processing, and performs an error correcting process on the reception data S5. Thus, if a transmission channel is in a radio wave state having a bit error rate within a range that can be corrected, communication reliability can be improved by performing error-free transmission/reception. Further, the CPU 101 selects, as necessary, programs from among those included in the ROM 102. For example, a communication process and processing program necessary for the wireless node to create an ad-hoc group is included as a group creation program P1. Further, a communication process and processing program for the wireless node to operate as a group master node is included in a master unit operating program P3, and a communication process and processing program for the wireless node to operate as a slave node is included in a slave unit operating program P4. Further, a rotation communication process and processing program for group master rotation is included in a rotation control program P2. A group master rotation timing and timings necessary for other CPU processing are calculated and obtained as necessary by the CPU 101 from timekeeping results for timekeeping constantly performed by the timer 104.

Figure 2:
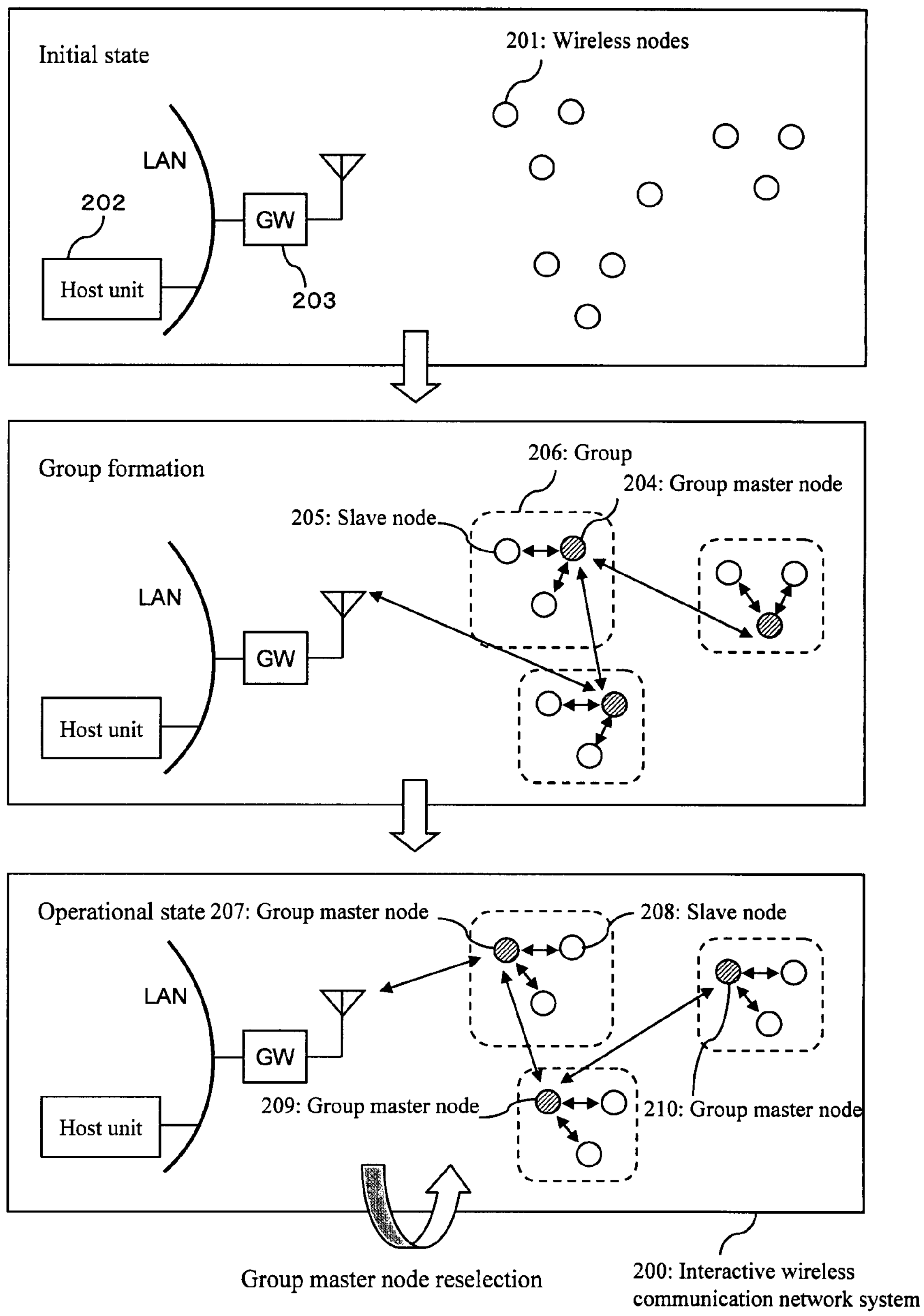
FIG. 2 is a constitutional diagram of an interactive wireless communication network in the first embodiment of the present invention.

FIG. 2 is a constitutional diagram of an interactive wireless communication network in the first embodiment of the present invention.

In FIG. 2, an interactive wireless communication network system 200 comprises a plurality of wireless nodes 201, a host unit 202, and a gateway unit (GW) 203 for performing relay between the host unit 202 and wireless nodes 201.

The plurality of wireless nodes 201 start in a randomly provided state in an area where a wireless network system is to be created (initial state). The plurality of randomly provided wireless nodes 201 are gradually formed into a number of groups 206 respectively comprising wireless nodes 201 in a number sufficiently fewer than the number of wireless nodes in the entire network. At this time, a group master node 204 is provisionally initialized from among the wireless nodes 201, and makes connection with a pre-set number of slave wireless nodes, forming a group 206. Because in general, the batteries of all wireless nodes are fully charged immediately after the initial state, any wireless node may become group master. At this time, a slave node 205 is connected under the provisional group master node 204. Further, wireless connection is performed with other provisional group master nodes and with the GW 203, and hopping communication paths among the groups are formed, thereby forming the basic configuration of the network system (group formation).

Thereafter, an optimal group master node is periodically reselected in each group. For example, by promoting the slave node 205 to a group master node 207 and demoting the group master node 204 to a slave node 208, rotation is performed for the role of a group master node, which is subject to a high processing load and consumes battery power quickly, thus equalizing battery power in a group. This reselection operation is periodically performed based on timekeeping results by the timer 104 provided in a group master node. The newly selected group master node 207 connects with the slave node 208, and performs inter-group hopping communications of the group 206 to form and maintain the interactive wireless communication network system 200 (operational state).

Next, an explanation will be given for an operation in the first embodiment of the present invention with reference to FIGS. 3, 4, 5 and 6.

Figure 6:
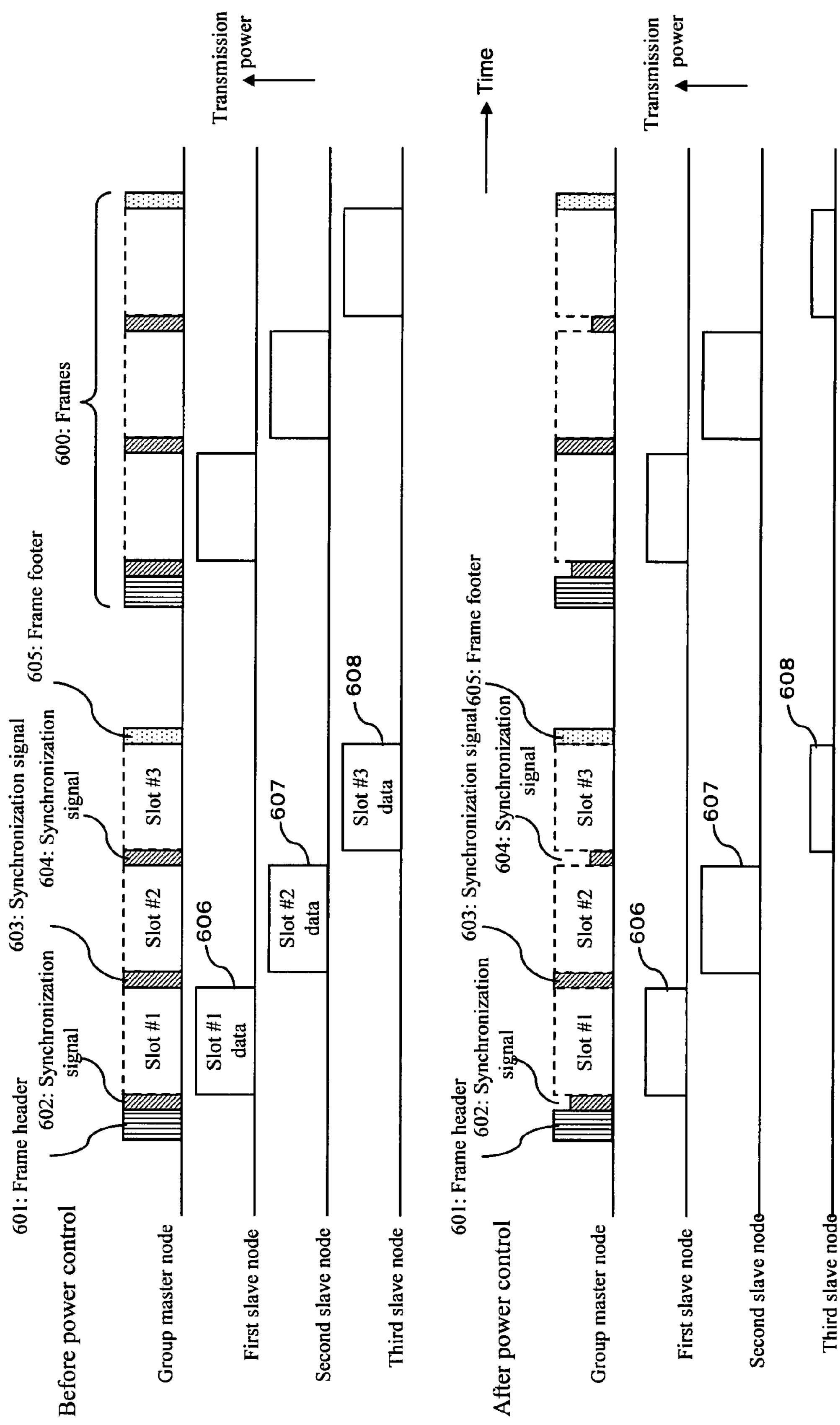
FIG. 6 is a diagram for explaining transmission data format in the first embodiment of the present invention.

FIG. 6 is a diagram for explaining transmission data format in the first embodiment of the present invention.

Data is transmitted between the group master node and slave nodes in the same wireless frequency channel and in a framing mode using data slots. The frame in FIG. 6 is limited to three slots to simplify explanation. In other words, the number of slave nodes in the group is three in this case.

In FIG. 6, a frame 600 comprises a frame header 601, slot #1, synchronization signal 602 serving as a synchronization signal for the slot #1, slot #2, synchronization signal 603 serving as a synchronization signal for the slot #2, slot #3, synchronization signal 604 serving as a synchronization signal for the slot #3, and frame footer 605.

The frame header 601 comprises a preamble for a slave node PLL circuit to extract a regeneration clock, an identifier unique to a group master node, and error detecting codes. Further, the synchronization signal 602 comprises a preamble for the first slave node PLL circuit to re-extract a regeneration clock, an identifier for designating the first node, a data field containing information for the group master node to control the first slave node, and error detecting/correcting codes. The synchronization signals 603 and 604 both have constitutions identical to that of the synchronization signal 602 with respect to the second and third nodes. The frame footer 605 comprises a termination identifier for preventing framing overrun and the like.

First, an explanation will be given for transmissions operation in a state before power control.

In a state before power control, both group master node and slave nodes perform transmission at maximum power, and the group master node repeats transmission of the frame 600. Upon detecting the synchronization signal 602 following the frame header 601, the first slave node transmits slot #1 data 606 that is own station data during the timing period for the slot #1. Similarly, upon detecting the synchronization signal 603 following the frame header 601, the second slave node transmits slot #2 data 607 that is own station data during the timing period for the slot #2, and upon detecting the synchronization signal 604 following the frame data 601, the third slave node transmits slot #3 data 608 that is own station data during the timing period for the slot #3. With such a configuration, each slave node can transmit own station data to the group master node.

In a state after power control, the group master node transmits the frame header 601 and frame footer 605 at maximum power, and each synchronization signal at the minimum required power for each slot. According to a process described below, each slave node receives in advance from the group master node a value for the minimum required power for its own station and transmits own station slot data at such designated power value. With such a configuration, optimum control of a transmission power can be performed.

The slot data transmitted by the slave nodes each comprises a preamble for the group master node PLL circuit to extract a regeneration clock, an identifier for indicating the slave node number of the transmitter, a data field containing for example control information from the slave nodes with respect to the group master node, a data field containing data collected by the slave nodes, and error detecting/correcting codes.

Figure 3:
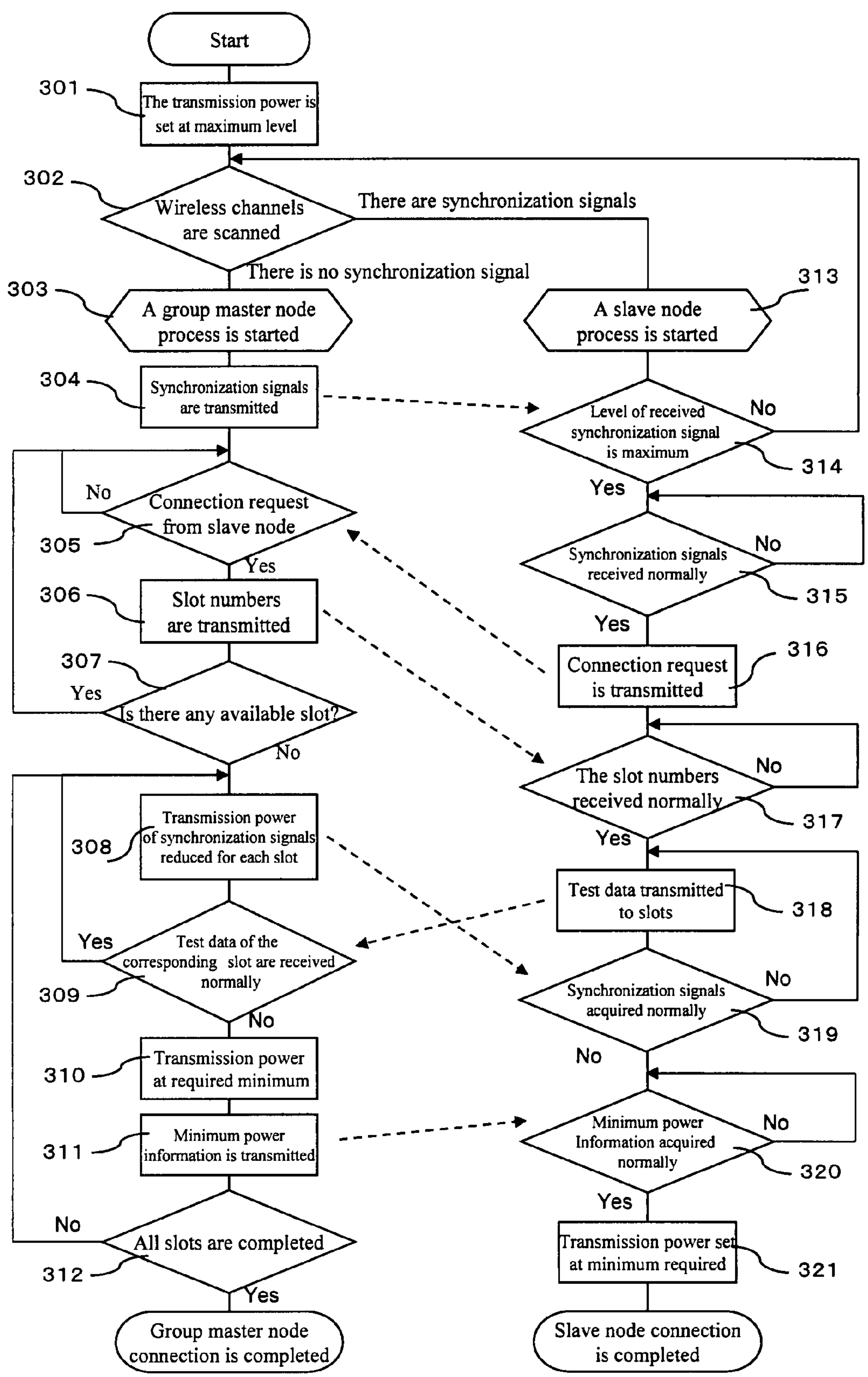
FIG. 3 is a flowchart for explaining a group creation operation in the first embodiment of the present invention.

FIG. 3 is a flowchart for explaining a group creation operation in the first embodiment of the present invention.

First, an explanation will be given for the process for discovering other wireless nodes.

All wireless nodes 201 set own station transmission power at the maximum level (Step 301), and while scanning wireless channels, check for the existence of a synchronization signal transmitted from a provisional group master node to each frequency channel (Step 302). Because failure to detect a synchronization signal means none of the wireless nodes has been made to serve as a group master node in such channel, a group master node process is started (Step 303). Because detection of a synchronization signal means existence of another wireless node serving as a group master node in such channel, a slave node process is started (Step 313). Because having a wireless node be a slave node for the closest group master node is more advantageous in terms of battery consumption, wireless channel are scanned (Step 302) to find a channel having a synchronization signal at the maximum reception level (Step 314). With the above process, wireless nodes can discover the existence of other nodes.

Next, an explanation will be given for the process for creating a group.

The group master node process and slave node process are performed as follows. The group master node 204 first transmits a synchronization signal to the relevant channel (Step 304), and waits for a connection request from the slave node 205 (Step 305). The slave node 205 stands by until it makes normal reception of a synchronization signal (Step 315), and transmits a connection request upon receiving the synchronization signal (Step 316). Upon receiving the connection request from the slave node 205 (Step 305), the group master node 204 transmits a slot number to be used by such slave node (Step 306). These steps 305, 306, and 307 are repeated for all of the slave nodes so that connection is made with the prescribed number of slave nodes. More specifically, all of the slots are reserved for slave nodes, and the above steps are repeated until no more slots are available. The slave nodes each receive a slot number allocated thereto (Step 317), and store the acquired slot number in a designated region of the RAM 103. With the above process, a group comprising wireless nodes is created.

Next, an explanation will be given for the process for controlling transmission power for each wireless node.

When allocation of slave nodes to all of the slots has been completed, the group master node 204 slightly reduces transmission power for the corresponding synchronization signal for each slot (Step 308), and repeats step 308 until reaching the lower limit at which test data carried on such slot data can be normally received by the slave nodes (Step 309). As long as such synchronization signal can be normally received (Step 319), a slave node transmits test data to the corresponding slot (Step 318). If a synchronization signal cannot be normally received due to excessive power reduction on the transmitting side, the slave node is no longer able to normally transmit test data, enabling detection of the lower limit of antenna power. For example, in the case of the slot #1, the transmission power of the synchronization signal 602 that is the synchronization signal of such slot is reduced by the group master node until test data transmitted to the slot #1 by the first slave node fails to be normally received. The group master node 204 sets a minimum required transmission power such that test data is normally received, with a slight power margin remaining (Step 310), and transmits the set value as minimum power information (Step 311). These steps 308-311 are executed for all of the slots (Step 312), and a minimum required transmission power is set for all slave nodes in its own group. The slave nodes receive the minimum power information addressed to its own station, store the acquired minimum power information in a designated region of the RAM 103, and set the transmission power from its own station at such a power value. With the above process, transmission power between the group master node and each slave node can be controlled at the minimum required level.

Here, minimum required transmission power is calculated for each destination by transmitting/receiving test data. Alternatively, actual operation data can be transmitted/received to calculate minimum required transmission power.

With the above processes, the group master node is connected with the slave nodes, completing the group creation operation.

Figure 4:
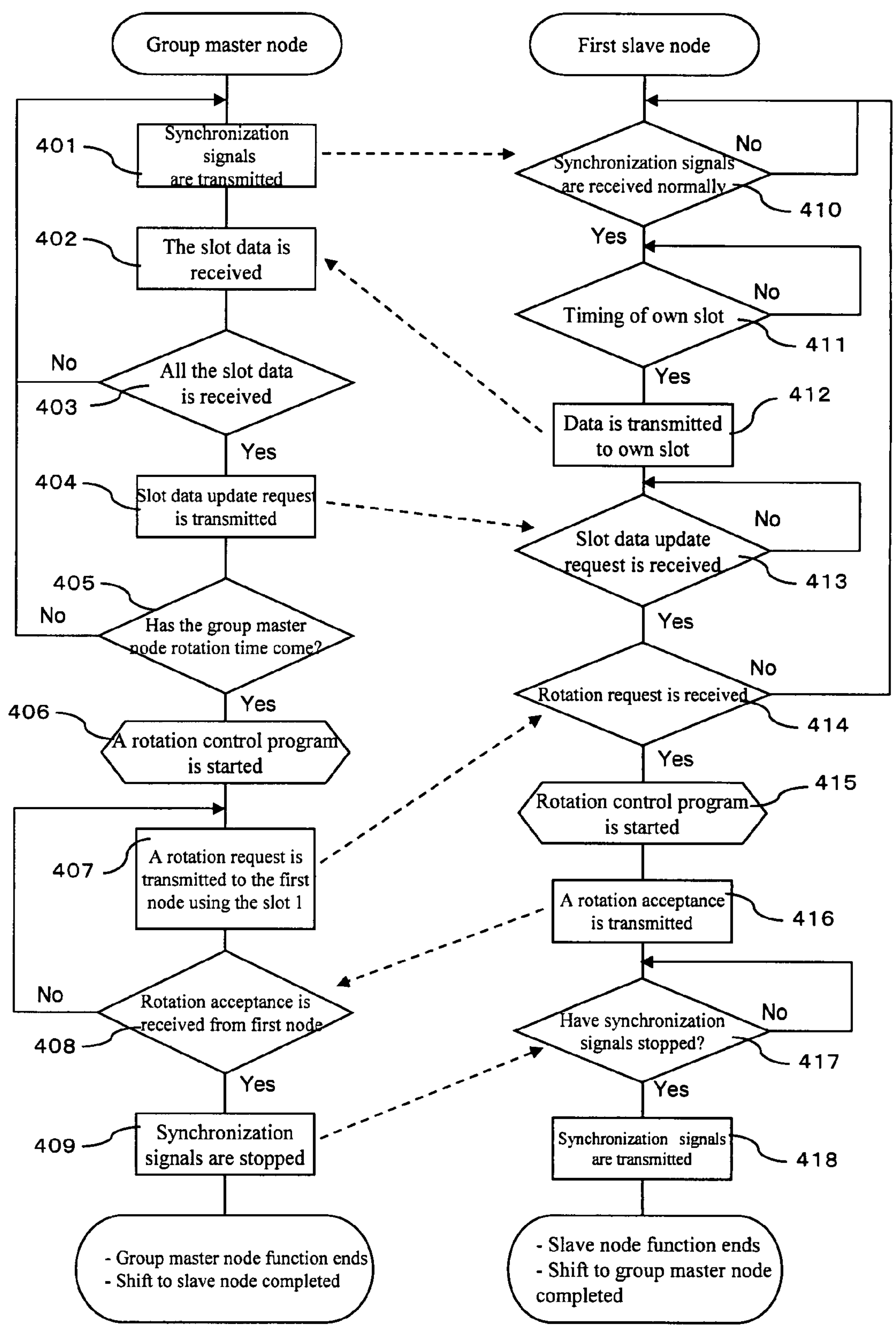
FIG. 4 is a flowchart for explaining a group master rotation operation in the first embodiment of the present invention.

FIG. 4 is a flowchart for explaining a group master rotation operation in the first embodiment of the present invention.

FIG. 4 illustrates a process for performing rotation of a group master node with a first slave node.

The group master node 204 transmits a synchronization signal (Step 401), receives slot data from the slot corresponding to such synchronization signal (Step 402), completes reception of data from all the slots (Step 403), and transmits a slot data update request to each slave node (Step 404). At this time, determination is made as to whether time for group master node rotation has come based on timekeeping results by the built-in timer 104 (Step 405). If the rotation time has not come, control returns to Step 401 to continue slot data reception, and if the rotation time has come, a rotation control program is started (Step 406) and a rotation request is transmitted to the first slave node using the slot #1, which is the initial slot in the time series (Step 407).

When it has made normal acquisition of the synchronization signal 602 addressed to its own station (Steps 410, 411), the first slave node transmits the slot #1 data to the slot #1 that serves as its own slot (Step 412). Further, the first slave node stands by until it receives a slot data update request (Step 413), and upon receiving the slot data update request, checks whether any rotation request addressed to its own station has been received (Step 414). At this time, if no rotation request has been received, control returns to Step 410 to continue another slot data transmission, and if a rotation request has been received, a rotation control program is started (Step 415) and rotation acceptance is transmitted (Step 416).

Upon receiving the rotation acceptance from the first node (Step 408), the group master node 204 stops transmission of synchronization signals, frame header 601, and frame footer 605 (Step 409) and ceases to function as group master node.

Upon confirming the stop of the synchronization signals (Step 417), the first slave node, in place of the group master node 204 and at maximum transmission power, starts transmission of synchronization signals, frame header 601, and frame footer 605 (Step 418). Because each slave node in the group, including the first slave node, always receives the frame 600 from the group master node 204, it is constantly monitoring the details of the frame 600 transmitted by the group master. For this reason, by simply replacing an identifier unique to the group master 204 in the frame 600 with an identifier designating the slave node 205, the slave node 205 can promptly take over transmission of the frame 600, facilitating rotated transmission as in Step 418.

With the above processes group master rotation operation is completed. According to the example in FIG. 2, the group master node 204 changes to a slave node 208, and the slave node 205 changes to the group master node 207.

Figure 5:
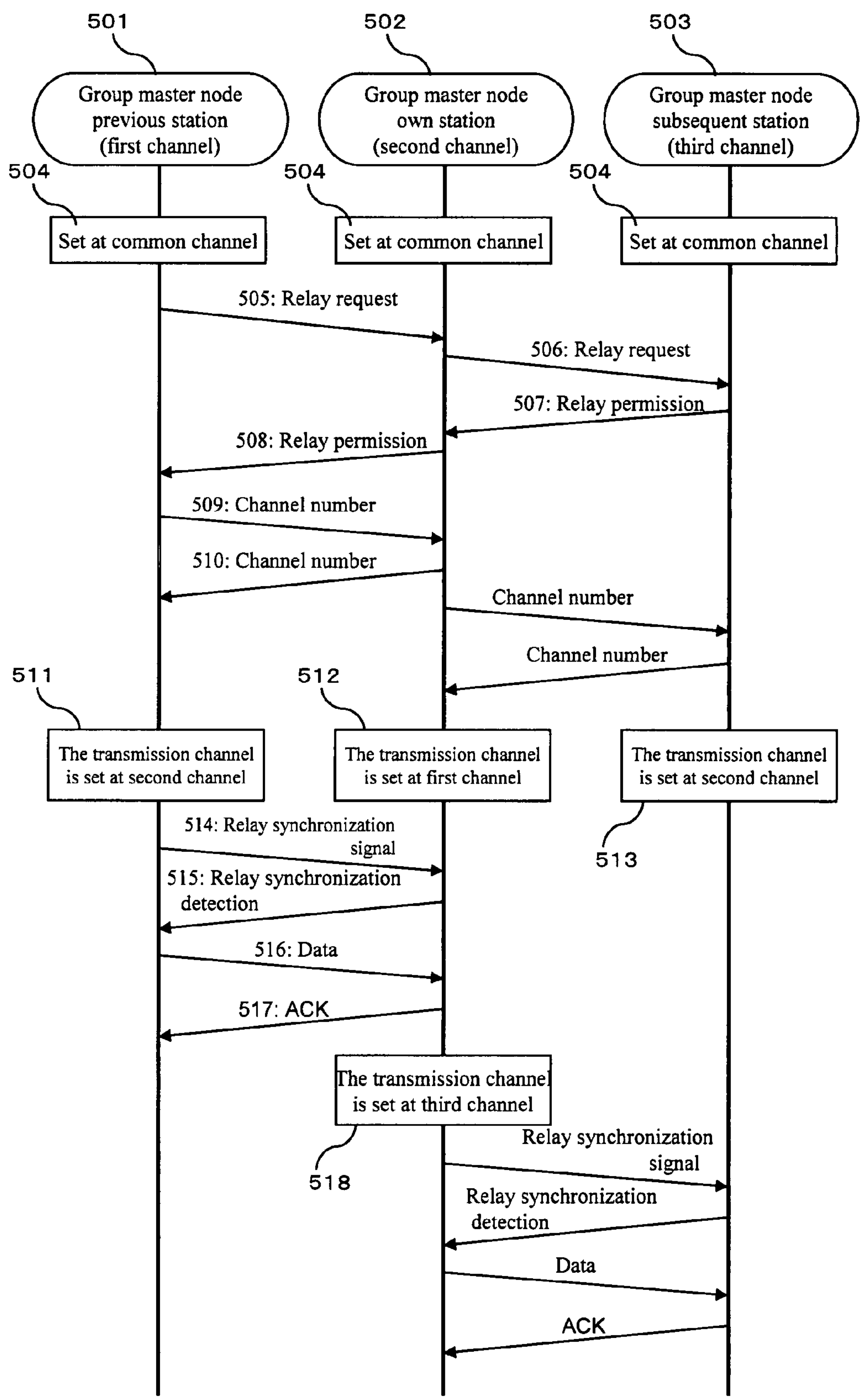
FIG. 5 is a process chart for explaining an inter-group hopping communication operation in the first embodiment of the present invention.

FIG. 5 is a process chart for explaining an inter-group hopping communication operation in the first embodiment of the present invention.

FIG. 5 shows a hopping communication operation among three groups; more specifically, it explains the process of hopping communication among three group master nodes.

In a hopping communication network comprising a previous station 501 serving as a group master node of the first wireless frequency channel, an own station 502 serving as a group master node of the second wireless frequency channel, and a subsequent station 503 serving as a group master node of the third wireless frequency channel, hopping communication of forward direction data is performed in the order from the previous station 501 to own station 502, and from own station 502 to the subsequent station 503, and hopping communication of reverse direction data is performed in a path opposite the forward direction data.

First, in order for all the stations to perform common interactive wireless communication, a wireless frequency channel is set at a pre-set common channel (Step 504). Next, the previous station 501 transmits a relay request 505 to own station 502. Own station 502 does not reply with a relay permission immediately after receiving the relay request, but instead gives priority to establishing a relay contract with the subsequent station 503 that is the hopping destination from own station 502. Thus own station 502 transmits a relay request 506 to the subsequent station 503, and the subsequent station 503, after making a relay contract with a further subsequent station, receives in response a relay permission 507, thereby establishing a relay contract between own station 502 and subsequent station 503. Thereafter, own station 502, by giving a reply of permission to the previous station 501, establishes a relay contract between the previous station 501 and own station 502.

Next, the previous station 501 transmits its own channel number 509 (first channel) to own station 502, and own station 502 transmits its own channel number 510 (second channel) to the previous station 501, and in this manner the channel number of the other station is learned. Similarly, channel numbers are transmitted between own station 502 and subsequent station 503, and in this manner the channel number of the other station is learned. According to the above process, a communication path for hopping communication is established among group master nodes.

When a communication path for hopping communication has been established, for the purpose of hopping communication between the previous station 501 and own station 502, the previous station 501 sets a transmission wireless frequency at the second channel that is the channel of own station 502 (Step 511), and own station 502 sets a transmission wireless frequency at the first channel that is the channel of the previous station 501 (Step 512). At this time, for reception wireless frequency, each station uses its own channel. Due to such channel settings, interactive wireless communication is enabled between the previous station 501 and own station 502, and interference to other stations, for example, the subsequent station 503, is prevented.

When channel settings have been completed, the previous station 501 transmits a relay synchronization signal 514 to own station 502, and own station 502 transmits a relay synchronization detection 515 upon receiving the relay synchronization signal 514. Upon receiving the relay synchronization detection 515, the previous station 501 transmits forward direction data 516 to own station 502. Upon normally receiving the data 561, own station 502 transmits an ACK 517 that serves as a response of normal reception to the previous station 501. Reverse data is transmitted from own station 502 to the previous station 501 by the same process but in reverse. Further, data is transmitted between own station 502 and subsequent station 503 using the identical process.

Through the above processes, hopping communication is performed among the group master nodes.

With such a constitution and processes, because the network is divided into a plurality of groups and rotation of the role of group master, which is subject to a high processing load, is performed in turn among wireless nodes, group master rotation is frequently executed in a group comprising much fewer wireless nodes than the number of wireless nodes in the entire network, efficiently preventing imbalanced power consumption among the wireless nodes. Further, within the range of a limited network constituted by a group, the master unit and slave units are in a state where interactive wireless communication is always available therebetween at transmission distances far shorter than the average transmission distance among wireless nodes in the entire network, thereby lowering the power consumption of the entire network and extending average battery life of the wireless nodes. Further, with hopping communication among the group master nodes, data can be transmitted without requiring a group master node to perform long distance communication to the GW, further preventing battery exhaustion.

Due to the above described effects, because batteries serving as wireless node power source are consumed without imbalance among the wireless nodes in the entire network and with energy consumption reduction being carried out, the life of the entire network can be extended.

FIG. 1 (*b*) is a device block diagram of a wireless node in the first embodiment of the present invention, and shows functional blocks of a wireless node when the power management method of the present invention has been embodied in a power management device. In FIG. 1 (*b*), the same constitutional elements as FIG. 1 (*a*) are assigned the same reference numerals, and explanation thereof is omitted.

In FIG. 1 (*b*), a group creation unit 121, rotation controller 122, master unit operating unit 123, and slave unit operating unit 124 control transmission/reception units via an I/O controller 125. Blocks 121-125 can be realized by combining a CPU and software, or by hardware.

The modulator 106 and demodulator 112 were illustrated as individual hardware blocks. But provided that such a constitution is satisfactory in terms of speed, the above functions may be performed as software processing in the CPU 101. Further, framing manner using data slots was used for a data transmission method. Alternatively, other transmission methods may be employed.

Second Embodiment

Figure 7:
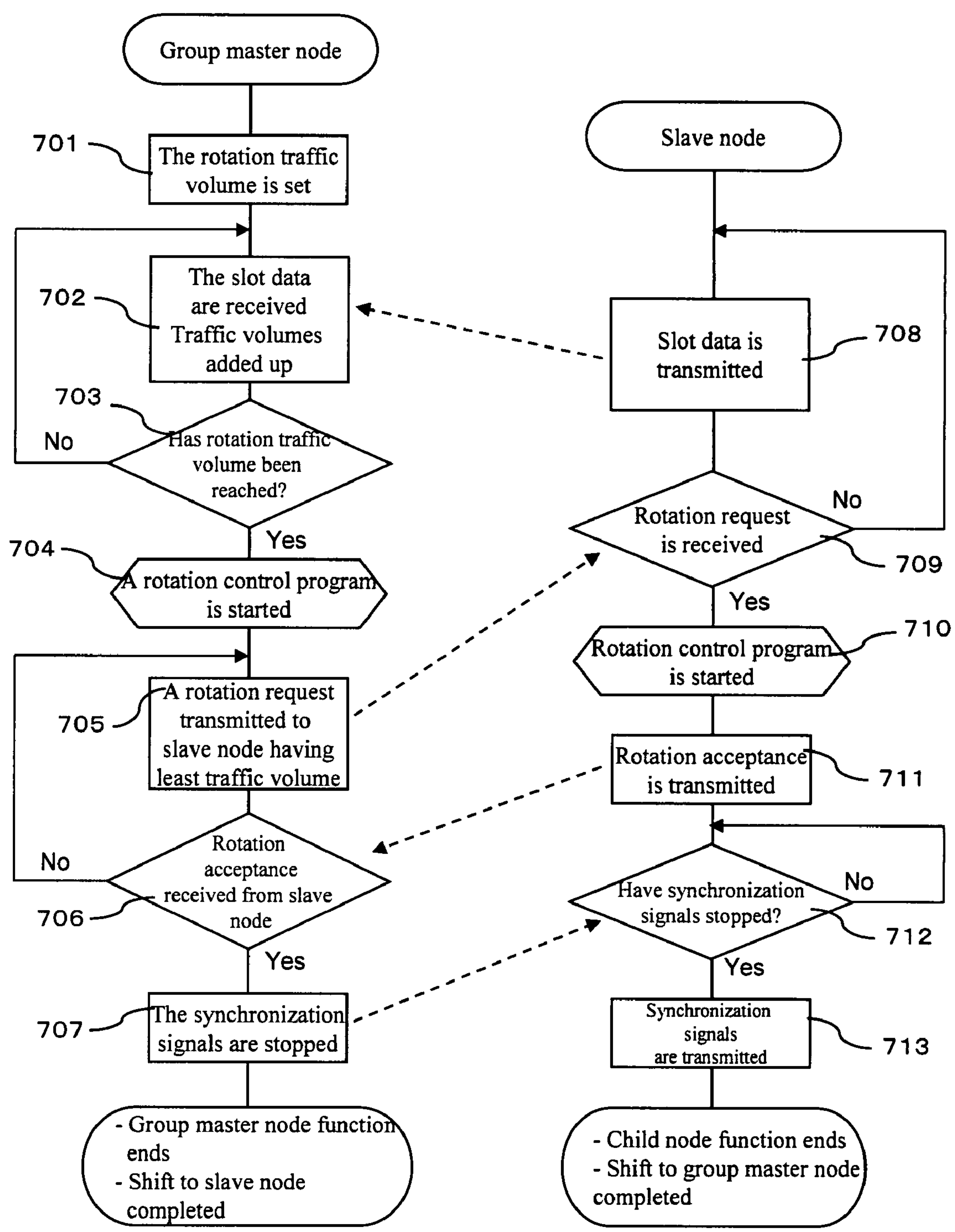
FIG. 7 is a flowchart for explaining a group master rotation operation using communication traffic in a second embodiment of the present invention.

FIG. 7 is a flowchart for explaining a group master rotation operation using communication traffic in a second embodiment of the present invention.

In FIG. 7, a group master node sets in advance a rotation traffic volume that is to serve as a criterion for determining time for group master node rotation (Step 701), receives slot data, and accumulates for each slave node the volume of communication traffic with such slave node (Step 702). When it has received data from all slots, it checks whether the volume of communication traffic with the slave nodes has reached the rotation traffic volume set in Step 701 (Step 703). If the communication traffic volume has not reached the rotation traffic volume, slot data reception is continued, and if the communication traffic volume of any one of the slave nodes has reached the rotation traffic volume, a rotation control program is started (Step 704). At this time, because it is assumed that the slave node having the least traffic volume is the one having the greatest remaining battery power, a rotation request is transmitted to such slave node (Step 705).

A slave node continues the slot data transmission process if there has been no rotation request addressed to its own station (Step 708), and if there has been a rotation request thereto (Step 709), a rotation control program is started (Step 710) and a rotation acceptance is transmitted (Step 711).

Upon receiving the rotation acceptance from a slave node (Step 706), the group master node stops transmitting synchronization signals, frame header 601, and frame footer 605 (Step 707) and ceases to function as the group master node.

Upon confirming the stop of the synchronization signals (Step 712), the slave node starts transmitting, in place of the group master node and at the maximum transmission power, synchronization signals, frame header 601, and frame footer 605 (Step 713).

The above processes complete the group master rotation operation in which communication traffic volume serves as rotation criterion. According to the example in FIG. 2, the group master node 204 changes to the slave node 208, and the slave node 205 changes to the group master node 207.

Third Embodiment

Figure 8:
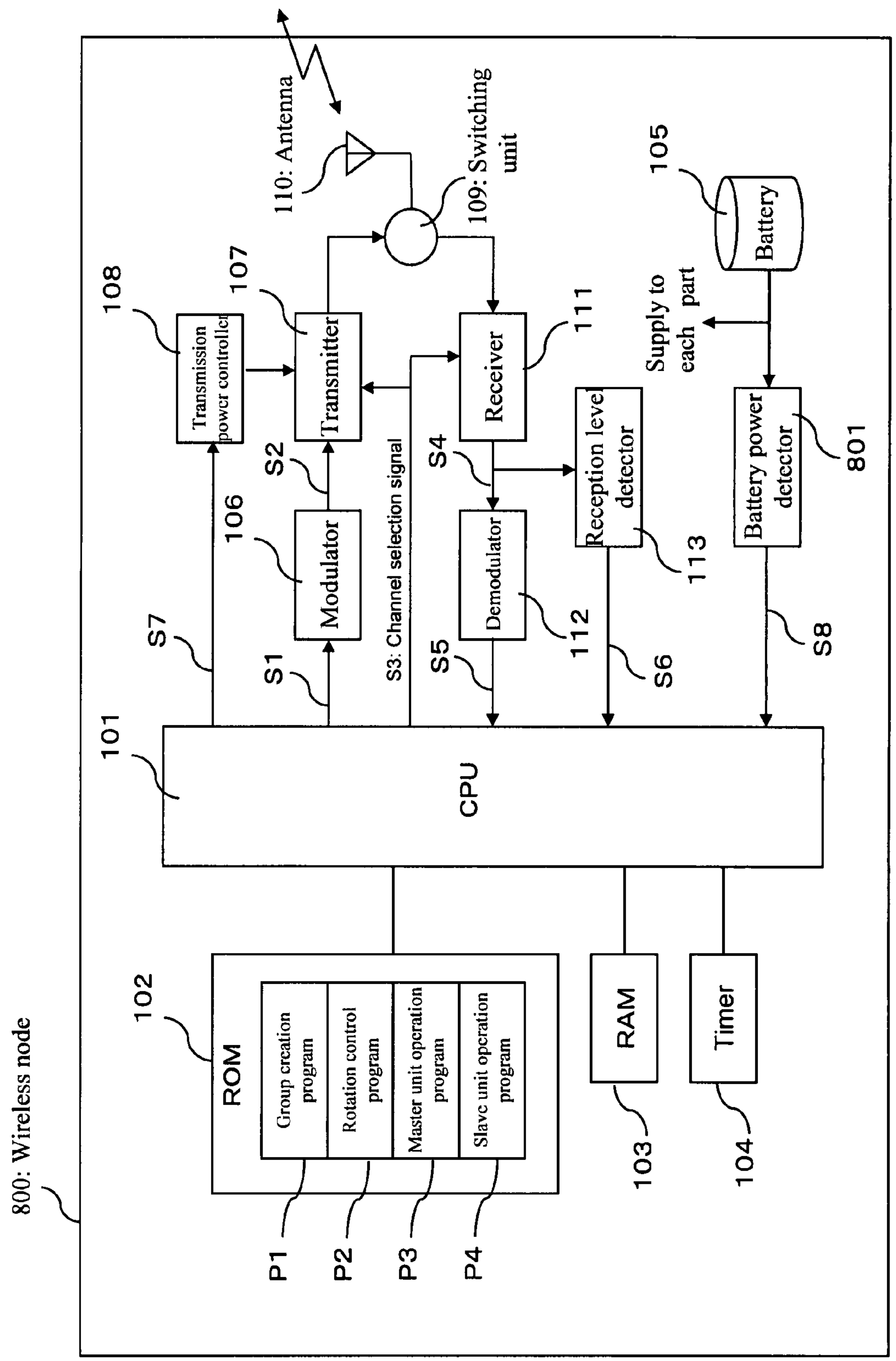
FIG. 8 is a block diagram of a wireless node in the third embodiment of the present invention.

FIG. 8 is a block diagram of a wireless node in the third embodiment of the present invention.

In FIG. 8, the same constitutional elements as in FIG. 1 (*a*) are assigned the same reference numerals, and explanation thereof is omitted.

In FIG. 8, a wireless node 800 comprises a battery power detector 801. The battery power detector 801 is configured to detect the amount of remaining power based on voltage and the like of a battery 105, and to input the battery power level S8 into the CPU 101. With such a configuration, the CPU 101 is capable of checking remaining battery power.

An explanation will be given with reference to the flowchart in FIG. 9 for the process of group master node rotation, using the wireless node 800 thus configured and based on remaining battery power.

Figure 9:
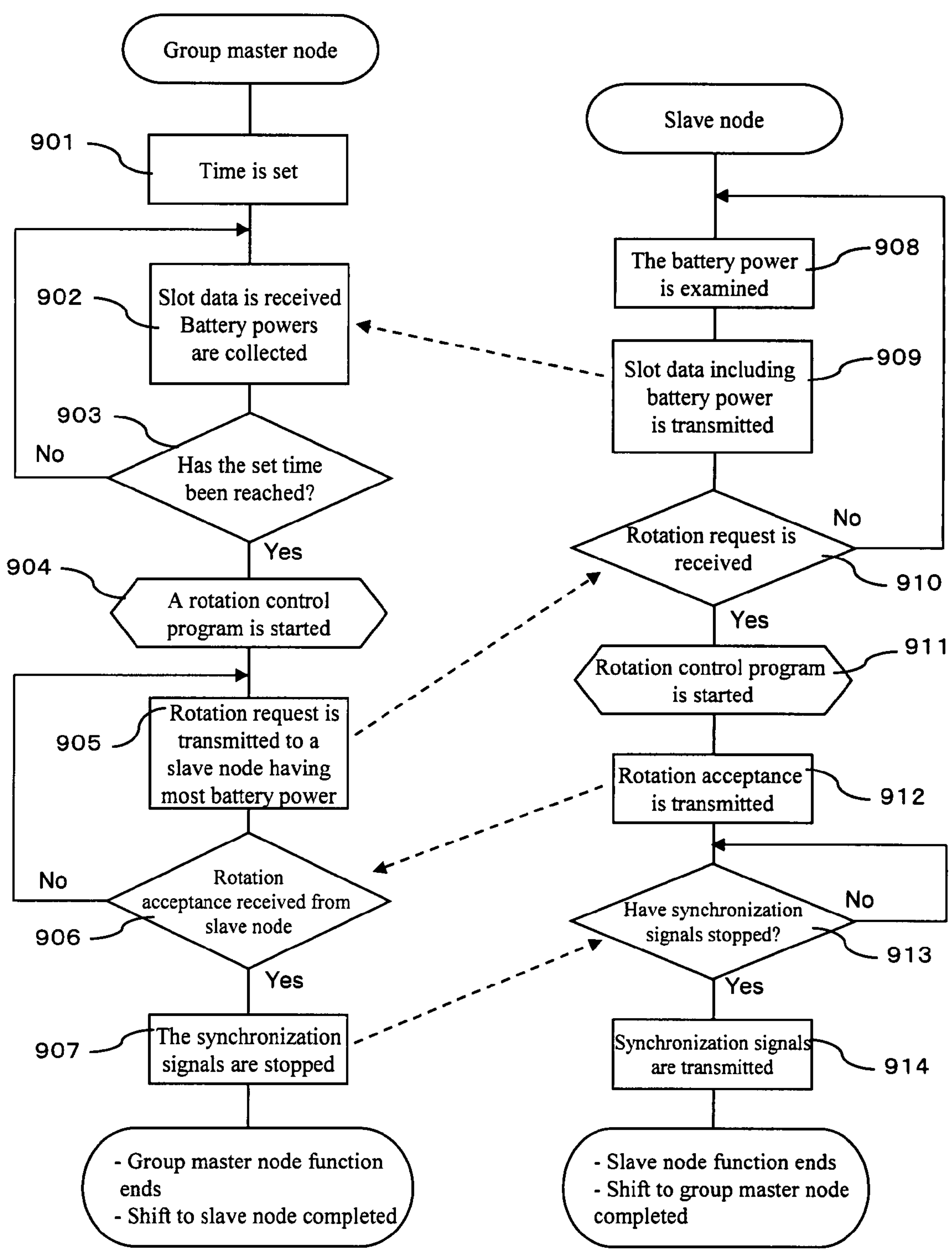
FIG. 9 is a flowchart for explaining a group master rotation operation using a battery power in the third embodiment of the present invention.

FIG. 9 is a flowchart for explaining a group master rotation operation using remaining battery power in the third embodiment of the present invention.

In FIG. 9, a slave node checks remaining battery power using the battery power detector 801 (Step 908), includes the battery power level S8 in slot data, and transmits the same (Step 909).

The group master node sets in advance the time that is to serve as a criterion for determining time for group master node rotation (Step 901), receives slot data, and collects information of slave node remaining battery power (Step 902). When it has received data from all slots, it checks whether the communication time with each slave node has reached the rotation time set in Step 901 (Step 903). If the communication time has not reached the rotation time, slot data reception is continued, and if the communication time of any one of the slave nodes has reached the rotation time, a rotation control program is started (Step 904). At this time, because the slave node having the greatest remaining battery power has the greatest available battery power, a rotation request is transmitted to such slave node (Step 905).

A slave node continues the battery power check and slot data transmission process unless there is a rotation request addressed to its own station (Steps 908, 909, 910), and if there is a rotation request thereto, the slave node starts up a rotation control program (Step 911) and transmits a rotation acceptance (Step 912).

Upon receiving the rotation acceptance from the slave node (Step 906), the group master node stops transmitting synchronization signals, frame header 601, and frame footer 605 (Step 907) and ceases to function as a group master node.

Upon confirming the stop of the synchronization signals (Step 913), the slave node starts transmitting, in place of the group master node 204 and at the maximum transmission power, synchronization signals, frame header 601, and frame footer 605 (Step 914).

The above processes complete the group master rotation operation in which remaining battery power serves as the rotation criterion. According to the example in FIG. 2, the group master node 204 changes to the slave node 208, and the slave node 205 changes to the group master node 207.

With the constitution and process as described above, because group master rotation timing is detected based on the wireless node battery power itself, the group master node rotation can be performed using a more accurate criterion.

Fourth Embodiment

Figure 10:
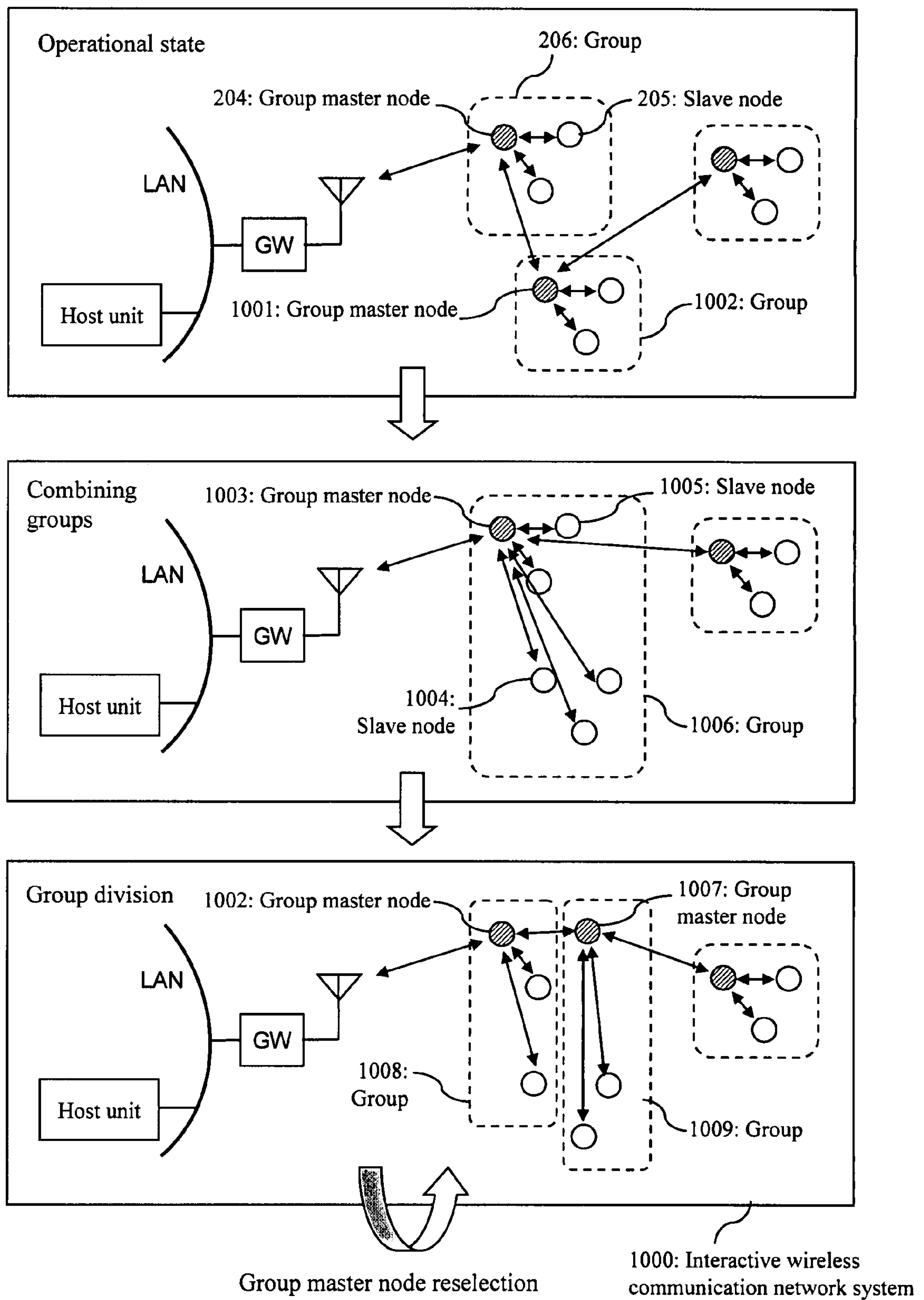
FIG. 10 is a constitutional diagram of an interactive wireless communication network in the fourth embodiment of the present invention.

FIG. 10 is a constitutional diagram of an interactive wireless communication network in the fourth embodiment of the present invention.

In FIG. 10, the same constitutional elements as in FIG. 2 are assigned the same reference numerals, and explanation thereof is omitted.

In FIG. 10, an interactive wireless communication network system 1000 comprises a group 206 having a group master node 204, and a group 1002 having a group master node 1001, the groups being operated separately from each other (operational state). When the average remaining battery power of the wireless nodes in the group 1002 is lower than a pre-set level, the group master node 1001 ceases to function as such, and at the same time all the wireless nodes in the group 1002 are caused to become slave nodes under the group master node 204, forming a new group 1006. The group master node 204 becomes a new group master node 1003. More specifically, the group 1002 is absorbed and merged into the group 206 (group merging). Thereafter, the group 1006 is scheduled to be divided into groups 1008 and 1009 in such manner as to reduce imbalance in battery power among the wireless nodes therein (group division). After division operational state commences.

An explanation will be given for the interactive wireless communication network 1000 thus configured, and more specifically for a group merging process, with reference to the flowchart of FIG. 11.

Figure 11:
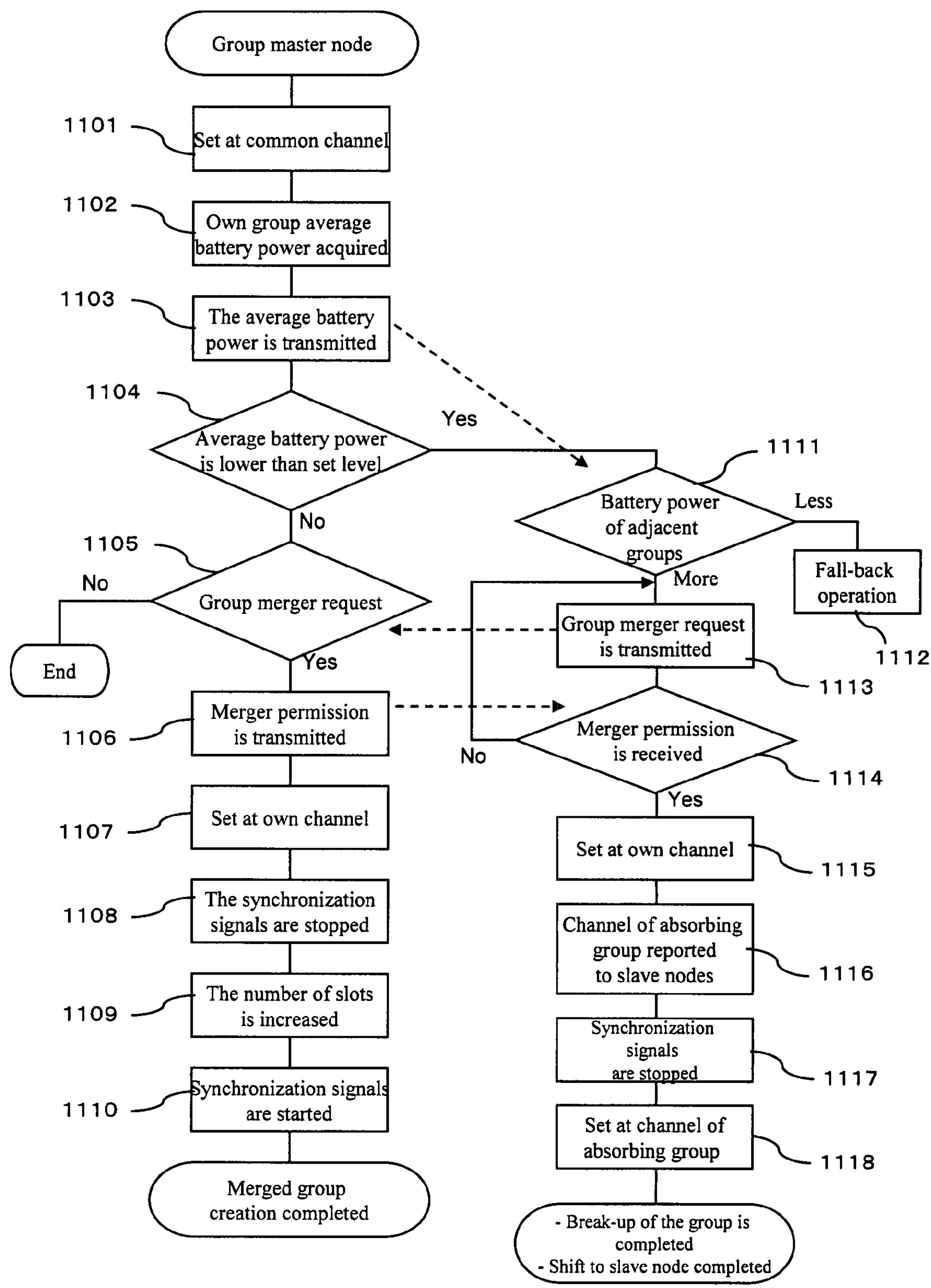
FIG. 11 is flowchart for explaining a group merging operation in the fourth embodiment of the present invention.

FIG. 11 is flowchart for explaining group merging operations in the fourth embodiment of the present invention.

Before the process of FIG. 11, group master nodes exchange constitutional information of their own group with other groups by hopping communication so that the constitutional information of other groups, that is, group identifier, total number of wireless nodes, wireless frequency channel being used, and other such information is shared.

First, an explanation will be given for the process of accepting group merger.

The group master node sets a wireless frequency channel as the common channel and moves ahead with processing using hopping communication (Step 1101). First, the group master node collects remaining battery power values from the slave nodes, and calculates the average remaining battery power of its own group including its own battery power (Step 1102). Then, it transmits the average remaining battery power calculated in Step 1102 to other group master nodes (Step 1103), and evaluates whether the average remaining battery power of its own group is lower than a pre-set level (Step 1104).

If the average remaining battery power is not at or lower than the set level, the group master node checks whether a group merger request has been received from another group master node (Step 1105), and if no group merger request has been received, the process ends. If a group merger request has been received, control subsequently proceeds with a merging process. In the merging process merging permission is first transmitted to indicate intent to accept merger with the other group (Step 1106). Thereafter, the wireless frequency is returned to its own channel (Step 1107), and the synchronization signal is temporarily stopped (Step 1108). Here, the number of necessary slots is calculated based on the number of wireless nodes of its own group and the other group (Step 1109), and the number of slots is increased and transmission of the synchronization signal is restarted (Step 1110).

Next, an explanation will be given for the process of requesting group merger.

If in Step 1104 it is found that the average remaining battery power of its own group is lower than the set level, the group master node evaluates the average remaining battery power of adjacent groups based on the average remaining battery power values received from other groups (Step 1111), and if the battery power of an adjacent group exceeds the set level, a merger request process is started, and if the battery power of adjacent groups is lower than the set level, because there is no adjacent group into which its own group can be combined, fall-back operations are started by lowering overall performance (Step 1112).

In the merger request process a group merger request is first transmitted to a group that will be the absorbing group (Step 1113), and the requester waits for merger permission (Step 1114). Upon obtaining merger permission, the group master node returns the wireless frequency back to its own channel (Step 1115), and transmits and reports the wireless frequency channel of the absorbing group to the slave nodes in its own group (Step 1116). Thereafter, the group master node stops the synchronization signal (Step 1117) and sets the channel at the channel of the absorbing group (Step 1118).

The above processes complete the group merging operation.

With such a constitution and processes, if there is imbalance in the average remaining battery power among groups, a plurality of groups having a large imbalance in the average remaining battery power are merged and then divided again, thereby reducing imbalanced average remaining battery power.

Here, two groups were merged and divided. Alternatively, more than two groups may be merged and divided. Further, the average remaining battery power of a group was made to serve as the criterion for merging groups. Alternatively, any parameters having correlation with the wireless node battery power may be used to obtain identical effects. Further, an explanation was given assuming that the number of the groups to be merged and the number of groups into which division is to be made are the same. Alternatively, depending on how much battery power is to be equalized, the number of groups before merger and the number of groups after group merger and division do not necessarily have to be the same.

Fifth Embodiment

Figure 12:
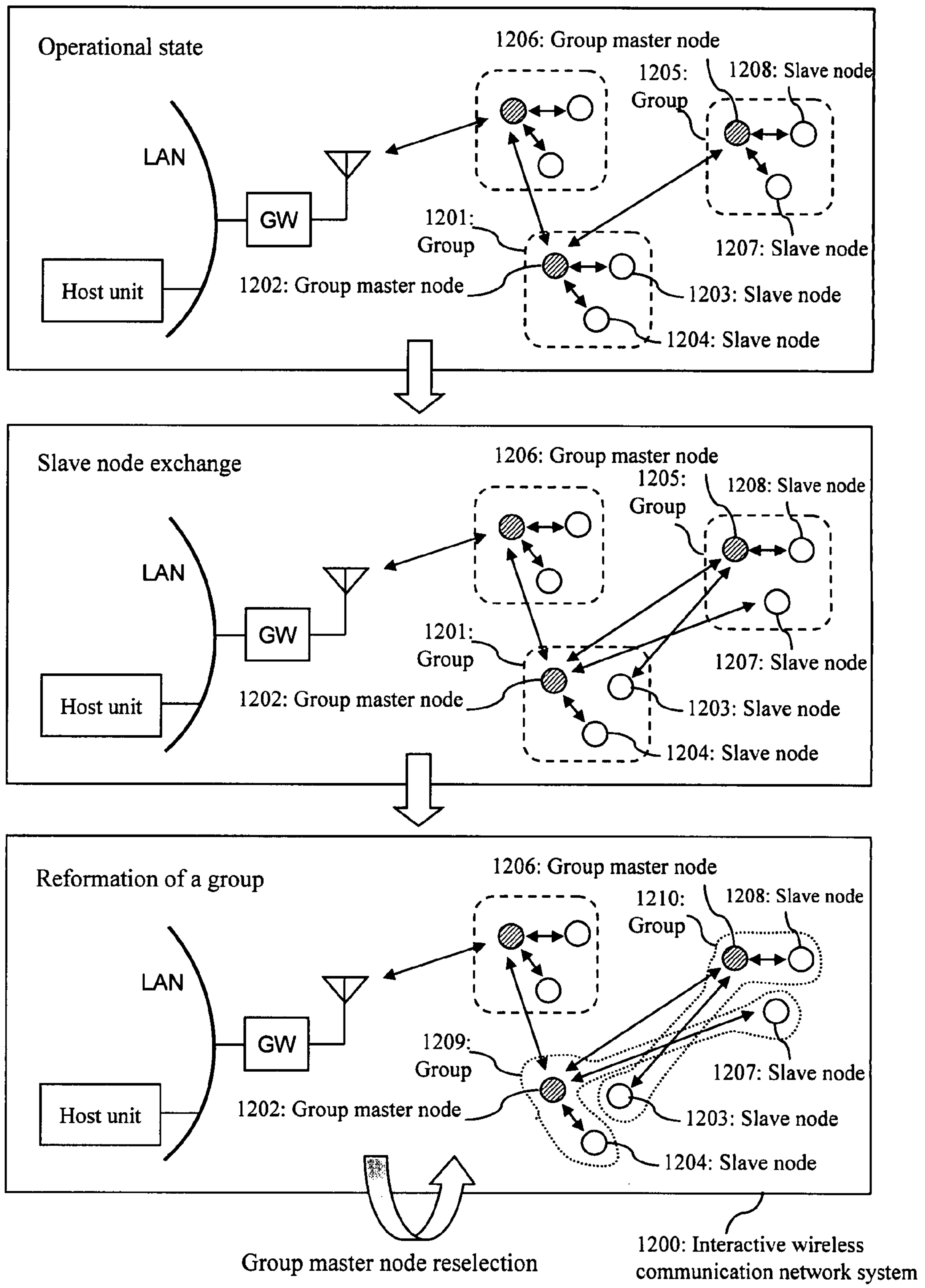
FIG. 12 is a constitutional diagram of an interactive wireless communication network in the fifth embodiment of the present invention.

FIG. 12 is a constitutional diagram of an interactive wireless communication network in the fifth embodiment of the present invention.

In FIG. 12, the same constitutional elements as in FIG. 2 are assigned the same reference numerals, and explanation thereof is omitted.

In FIG. 12, an interactive wireless communication network system 1200 comprises as constitutional elements a group 1201 having a group master node 1202, a slave node 1203, and a slave node 1204, and a group 1205 having a group master node 1206, a slave node 1207, and a slave node 1208 (operational state). Here, when the battery power of the slave node 1203 in the group 1201 is lower than a pre-set level, the group master node 1202 transmits a slave node exchange request to the group master node 1206. The group master node 1206, having received the exchange request, makes the node 1207 having the greatest remaining battery power in its own group a node to be exchanged. Thereafter, the slave node 1203 and slave node 1207 to be exchanged receive a separation command from their respective own group master node, and are separated from their groups when the synchronization signals for the respective slots used by such slave nodes are stopped. The separated slave nodes switch their wireless frequency channel to that of their new group, and start interactive communications based on a communication request from the new group master node (slave node exchange). Upon completing the slave node exchange, group master nodes respectively recreate a new group 1209 and group 1210 comprising the existing slave nodes and newly exchanged slave node (group reformation). After group reformation, an operational state is entered into.

With such a constitution and processes, if there is an extremely large imbalance such that imbalance in wireless node battery power cannot be eliminated just by intra-group group master rotation, such imbalance is eliminated by exchange of wireless nodes with another group.

When a group master node has received a rotation request from another group master node, if the average remaining battery power of its own group would be significantly lowered by sending out a node to be exchanged from its own group and equalization would become difficult, the exchange request can be rejected. The group master node whose exchange request is rejected may abandon slave node exchange with such group and transmit a rotation request to another group in search for a group with which to carry out exchange, or may abandon the exchange process itself and commence fall-back operations.

Sixth Embodiment

Figure 13:
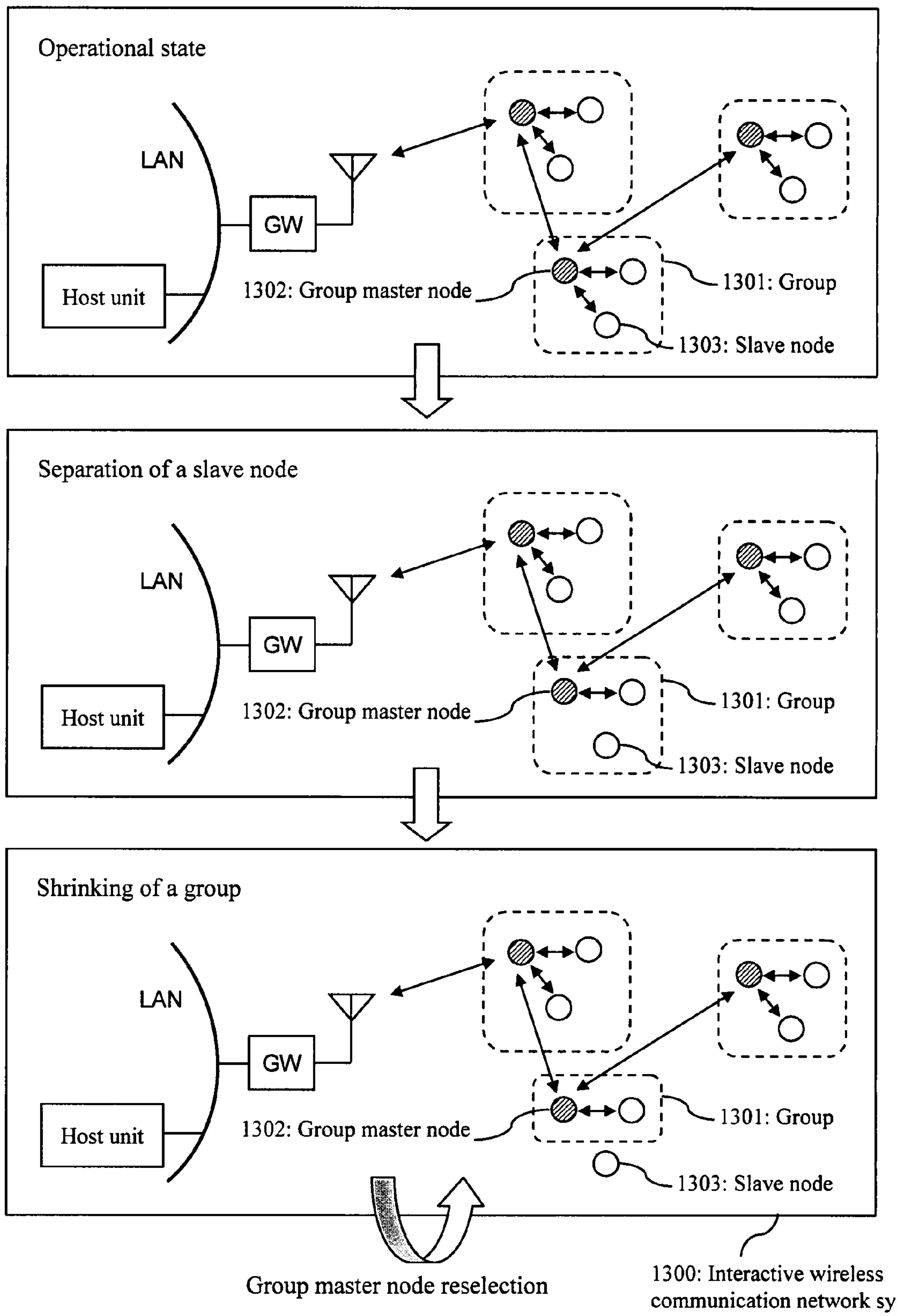
FIG. 13 is a constitutional diagram of an interactive wireless communication network in the sixth embodiment of the present invention.

FIG. 13 is a constitutional diagram of an interactive wireless communication network in the sixth embodiment of the present invention.

In FIG. 13, the same constitutional elements as in FIG. 2 are assigned the same reference numerals, and explanation thereof is omitted.

In FIG. 13, an interactive wireless communication network system 1300 comprises as constitutional elements a group 1301 having a group master node 1302, a slave node 1303, and another slave node (operational state). Here, when the battery power of the slave node 1303 in the group 1301 is lower than a pre-set level, the group master node 1302 transmits a separation command to the slave node 1303 and thereafter stops the synchronization signal for the slot used by such slave node (slave node separation). Upon completing separation of the slave node 1303, the group master node 1302 recreates a group comprising only the existing slave nodes. Because it was unable to find a synchronization signal from a new group master node, the separated slave node 1303 stops transmission/reception operations, and in an idling state ends its battery life (group shrinkage). After group shrinkage an operational state is entered into.

With such a constitution and processes, if there is a wireless node that has extremely low battery power even after intra-group group master rotation or inter-group wireless node exchange, such wireless node is forcibly separated from the group, thereby avoiding network problems caused by wireless node malfunction due to power exhaustion.

Seventh Embodiment

In the second embodiment the group master node monitors volume of communication traffic with slave nodes in the group. Alternatively, the slave nodes can respectively monitor their own communication traffic volume and report the same to the group master, and group master rotation is performed with the slave node having the lowest volume of communication traffic. This example will be explained as the seventh embodiment.

Figure 14:
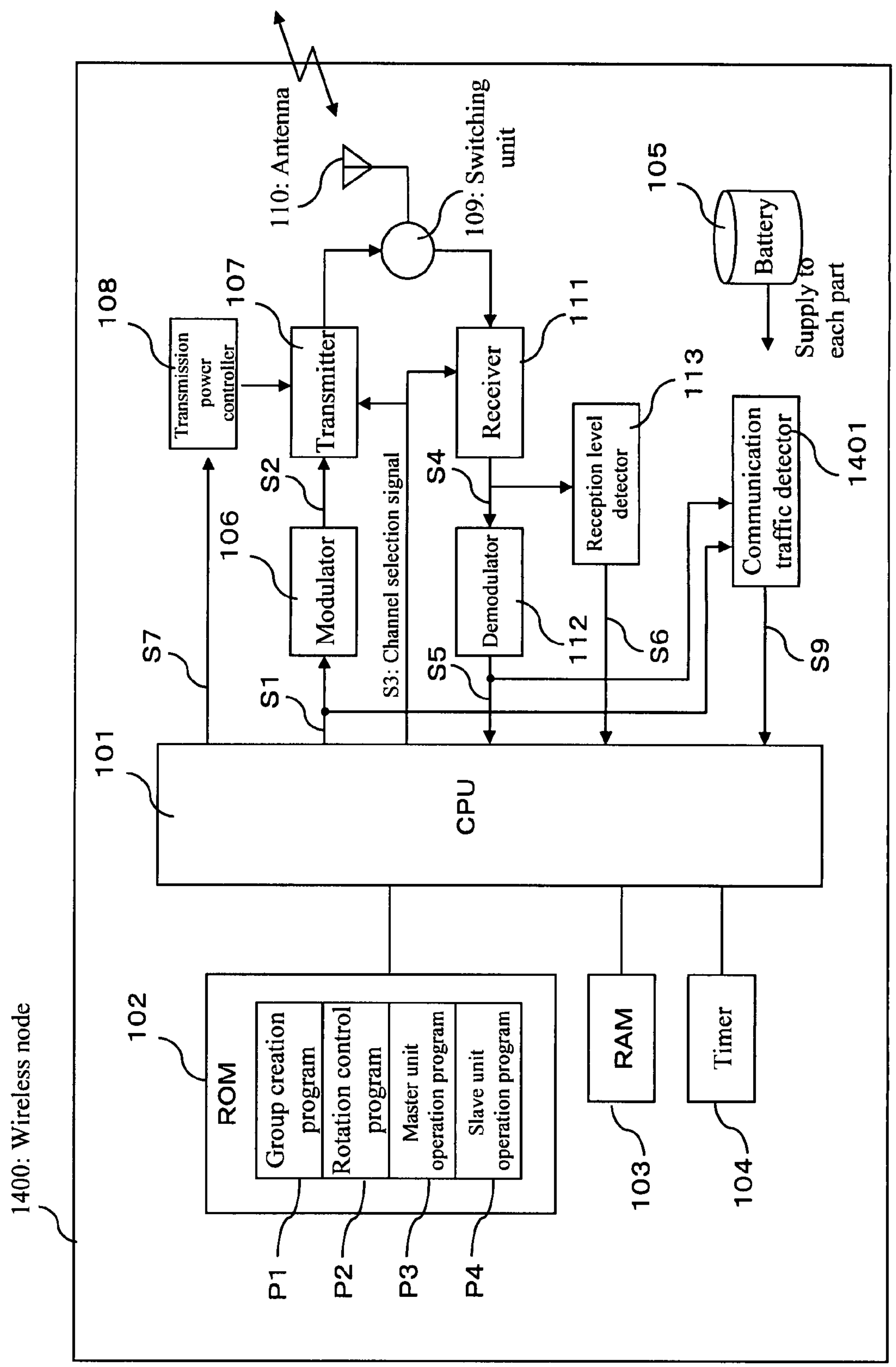
FIG. 14 is a block diagram of a wireless node in the seventh embodiment of the present invention.

FIG. 14 is a block diagram of a wireless node in the seventh embodiment of the present invention.

In FIG. 14, the same constitutional elements as in FIG. 1 (*a*) are assigned the same reference numerals, and explanation thereof is omitted.

In FIG. 14, a wireless node 1400 comprises a communication traffic detector 1401. The communication traffic detector 1401 is configured so as to monitor data transmitted from and received by the CPU 101, and to input communication traffic information S9 into the CPU 101. With such a configuration, the CPU 101 can add up the volume of communication traffic within a prescribed time based on the communication traffic information S9 from the communication traffic detector 1401.

An explanation will be given with reference to FIG. 15 for a process for group master node rotation, using the wireless node 1400 thus configured, based on communication traffic volume.

Figure 15:
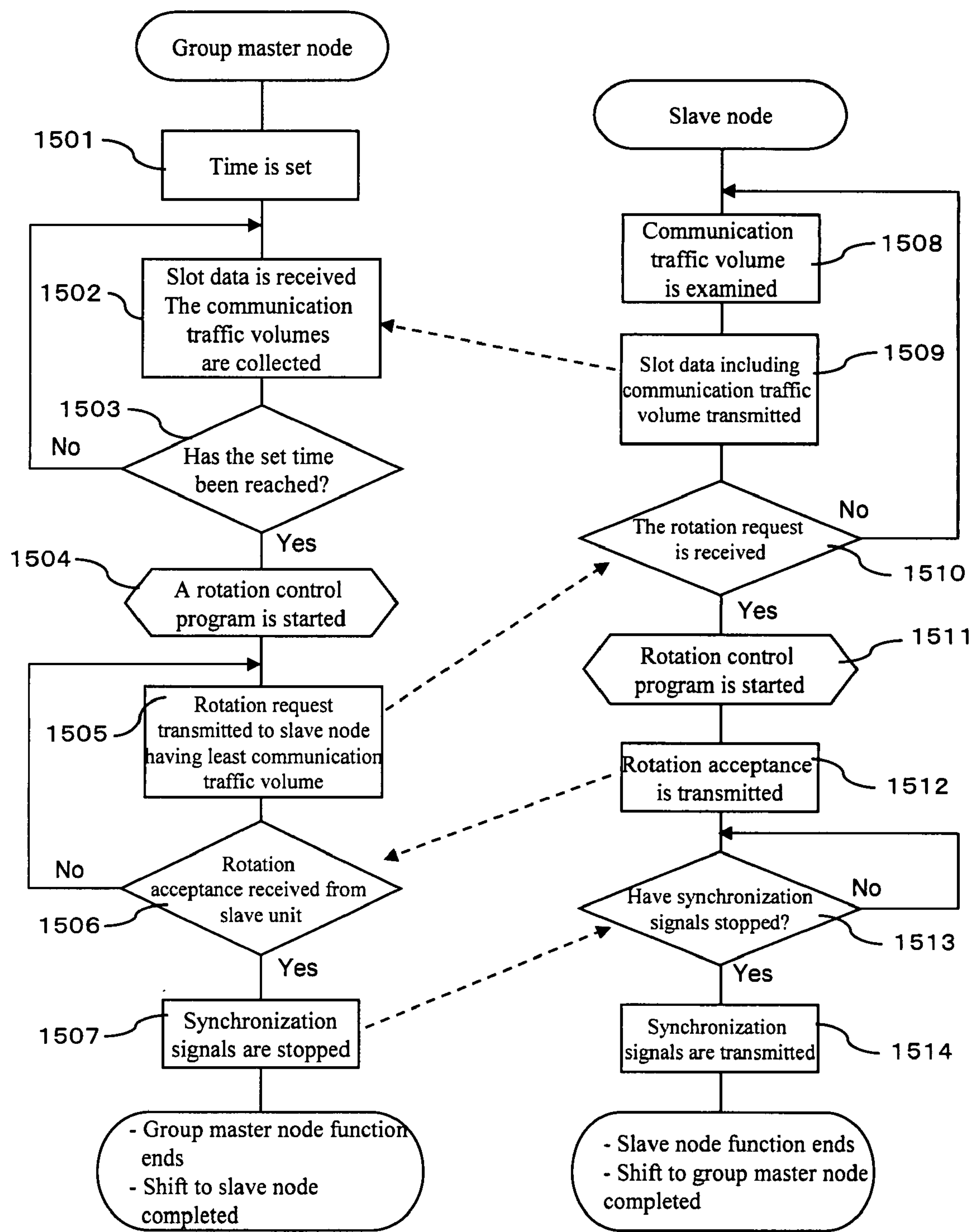
FIG. 15 is a flowchart for explaining a group master rotation operation using a communication traffic volume in the seventh embodiment of the present invention.

FIG. 15 is a flowchart for explaining a group master rotation operation using communication traffic volume in the seventh embodiment of the present invention.

In FIG. 15, a slave node checks volume of communication traffic using the communication traffic detector 1401 (Step 1508), and includes the communication traffic information S9 in the slot data and transmits the same (Step 1509).

The group master node sets in advance the time that is to serve as a criterion for determining time for group master node rotation (Step 1501), receives slot data, and collects information of the slave node communication traffic volume (Step 1502). Upon receiving data of all slots, it checks whether the communication time with slave nodes has reached the rotation time set in Step 1501 (Step 1503), and if a rotation time has not come, the slot data reception is continued, and if rotation time of any one of the slave nodes has come, a rotation control program is started (Step 1504). At this time, a rotation request is transmitted to the slave node having the smallest communication traffic volume (Step 1505).

If there has been no rotation request addressed to its own station, a slave node continues checking communication traffic volume and the slot data transmission process (Steps 1508, 1509, 1510), and if there has been a rotation request thereto, the slave node starts up a rotation control program (Step 1511) and transmits a rotation acceptance (Step 1512).

Upon receiving the rotation acceptance from the slave node (Step 1506), the group master node stops transmitting synchronization signals, frame header 601, and frame footer 605 (Step 1507) and ceases to function as a group master node.

Upon confirming the stop of the synchronization signals (Step 1513), the slave node starts transmitting, in place of the group master node and at the maximum transmission power, synchronization signals, frame header 601, and frame footer 605 (Step 1514).

The above processes complete the group master rotation operation having communication traffic volume as the rotation criterion. According to the example in FIG. 2, the group master node 204 changes to the slave node 208, and the slave node 205 changes to the group master node 207.

With the constitution and processes thus explained, group master rotation timing can be detected based on communication traffic volume, which has a high correlation with wireless node battery consumption.

Eighth Embodiment

Merging and dividing groups in the interactive wireless communication network as described in FIG. 10 (fourth embodiment) can be configured with volume of communication traffic of the wireless nodes as a trigger for execution. Such a case will be explained below as the eighth embodiment.

In this eighth embodiment, as in the seventh embodiment, wireless nodes are configured so as to comprise a communication traffic detector 1401, as shown in FIG. 14. The group master node receives communication traffic information from the slave nodes in the group, and groups are merged and divided based thereupon.

Figure 16:
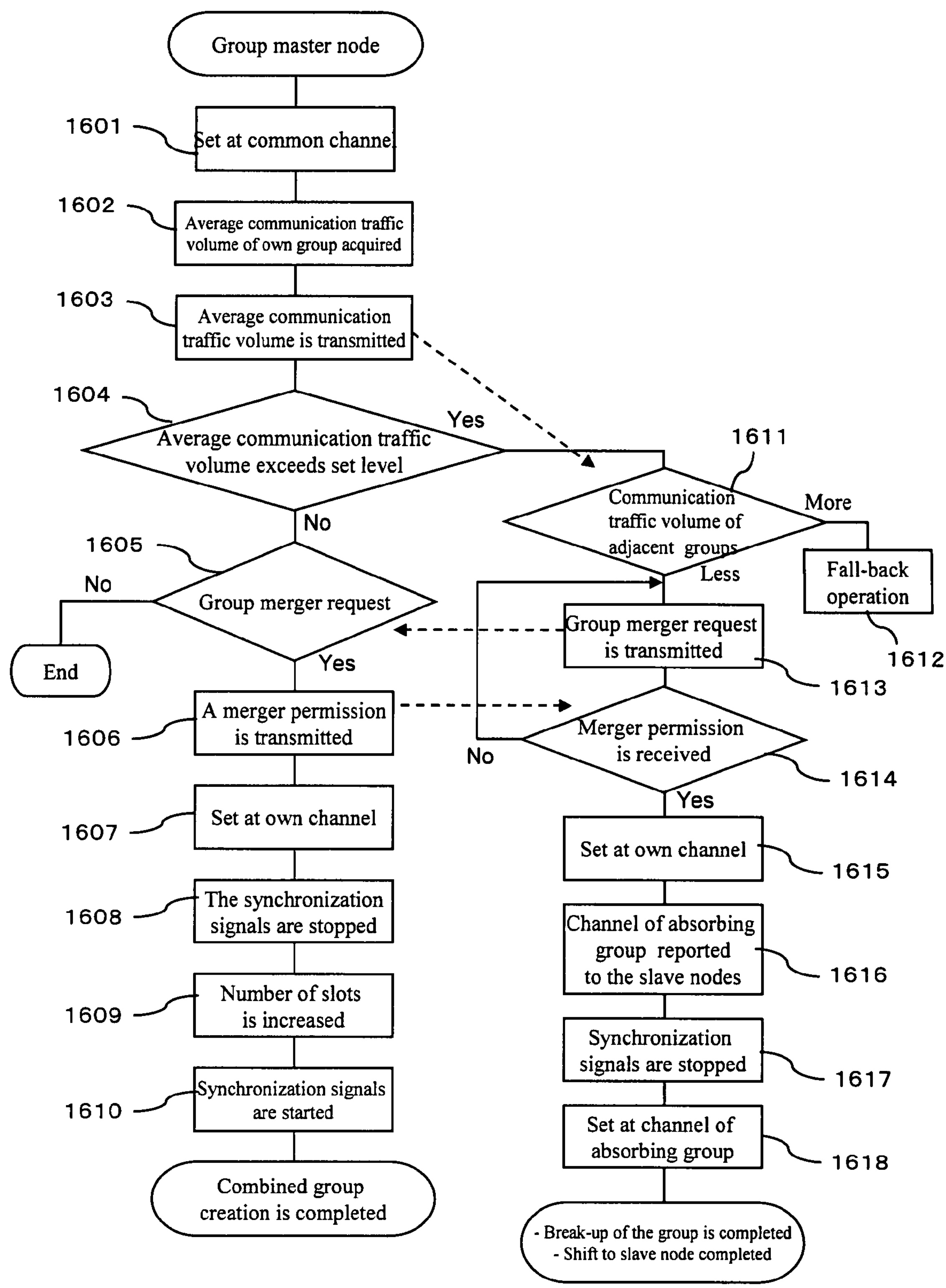
FIG. 16 is a flowchart for explaining a group merging operation in the eighth embodiment of the present invention.

FIG. 16 is a flowchart for explaining a group merging operation in the eighth embodiment of the present invention.

Prior to the process of FIG. 16, group master nodes exchange constitutional information of their own group with other groups by hopping communication so that the constitutional information of other groups, that is, group identifier, total number of wireless nodes, wireless frequency channel being used, and other such information is shared.

First, an explanation will be given for the process of accepting group merger.

The group master node sets the wireless frequency channel at a common channel and proceeds with processing using hopping communication (Step 1601). First, the group master node collects information of communication traffic volume from the slave nodes, and calculates the average communication traffic volume of its own group including own communication traffic volume (Step 1602). Then, it transmits the average communication traffic volume calculated in Step 1602 to other group master nodes (Step 1603), and evaluates whether the average communication traffic volume of its own group exceeds a pre-set level (Step 1604).

If the average communication traffic volume does not exceed the set level, the group master node checks whether a group merger request has been received from another group master node (Step 1605), and if no group merger request has been received, the process ends. If a group merger request has been received, a merging process then starts. In the merging process, merger permission is first transmitted to indicate intent to accept merger with the other group (Step 1606). Thereafter, the group master node returns the wireless frequency to its own channel (Step 1607), and temporarily stops the synchronization signal (Step 1608). Here, the necessary number of slots is calculated based on the number of wireless nodes in its own group and the other group (Step 1609), the number of slots is increased, and transmission of the synchronization signal is restarted (Step 1610).

Next, an explanation will be given for the process of requesting group merger.

If in Step 1604 it is found that the average communication traffic volume of its own group exceeds the set level, the group master node evaluates average communication traffic volume of adjacent groups based on the average communication traffic volume from the other groups (Step 1611). If the average communication traffic volume of an adjacent group is at or lower than the set level, a merging request process is started, and if the average communication traffic volume of adjacent groups exceeds the set level, because there is no adjacent group with which the requester can be merged, fall-back operations are commenced by lowering overall performance and the like (Step 1612).

In the merger request process, a group merger request is first transmitted to the absorbing group (Step 1613), and merger permission is waited for (Step 1614). When merger permission is obtained, the group master node returns the wireless frequency to its own channel (Step 1615), and transmits and reports the wireless frequency channel of the absorbing group to its own group slave nodes (Step 1616). Thereafter, synchronization signals are stopped (Step 1617) and the channel is set to that of the absorbing group (Step 1618).

The above processes complete the group merging operation.

With such a constitution and processes, if there is imbalance in the average communication traffic volume among groups, a plurality of groups having a large imbalance in the average communication traffic volume are merged and then divided again, thereby reducing imbalanced average communication traffic volume.

Here, two groups were merged and divided. Alternatively, more than two groups may be merged and divided. Further, an explanation was given assuming that the number of the groups to be merged and the number of groups into which division is to be made are the same. Alternatively, depending on communication traffic volume equalization conditions, the number of groups before merger and the number of groups after merger and division do not necessarily have to be the same.

Ninth Embodiment

The invention can be configured such that in an inter-group slave node exchange process as described in the FIG. 12 (fifth embodiment) the communication traffic volume of wireless nodes serves as trigger for execution. Such a case will be described below as the ninth embodiment.

In the ninth embodiment, as in the seventh embodiment, each wireless node is configured so as to comprise a communication traffic detector 1401 as shown in FIG. 14. A group master node receives communication traffic information from the slave nodes in its group, and based upon such information performs slave node exchange with another group.

In FIG. 12, an interactive wireless communication network system 1200 comprises as constitutional elements a group 1201 having a group master node 1202, slave node 1203, slave node 1204, and group 1205 comprising a group master node 1206, slave node 1207, and slave node 1208 (operational state). Here, if the communication traffic volume of the slave node 1203 in the group 1201 exceeds a pre-set level, the group master node 1202 transmits a slave node exchange request to the group master node 1206. The group master node 1206 having received the exchange request designates the slave node 1207 having the smallest communication traffic volume in its own group as a node to be exchanged. Thereafter, the slave node 1203 and slave node 1207 to be exchanged each receive a separation command from the group master node of its own group, and are separated from their respective groups by stop of the synchronization signals for the slots used by such slave nodes. The separated slave nodes switch their wireless frequency channel to that of the group into which they are to be exchanged, and interactive communication starts based on the communication request from a new group master node (slave node exchange). Once the slave node exchange is completed, the group master nodes respectively recreate a new group 1209 and group 1210 comprising existing nodes and newly exchanged slave node (group reformation). After group reformation an operational state is entered into.

With such a constitution and processes, if there is an extremely large imbalance such that imbalance in communication traffic volume cannot be eliminated just by intra-group group master rotation, such imbalance is eliminated by exchange of wireless nodes with another group.

When a group master node has received a rotation request from another group master node, if the average communication traffic volume of its own group would be significantly lowered by sending out a node to be exchanged from its own group and equalization would become difficult, the exchange request can be rejected. The group master node whose exchange request is rejected may abandon slave node exchange with such group and transmit a rotation request to another group in search for a group with which to carry out exchange, or may abandon the exchange process itself and commence fall-back operations.

Tenth Embodiment

The invention can be configured so that retransmission frequency of the wireless nodes is monitored and group master node rotation is carried out based on retransmission frequency. Such a case will be explained below as the tenth embodiment.

Figure 17:
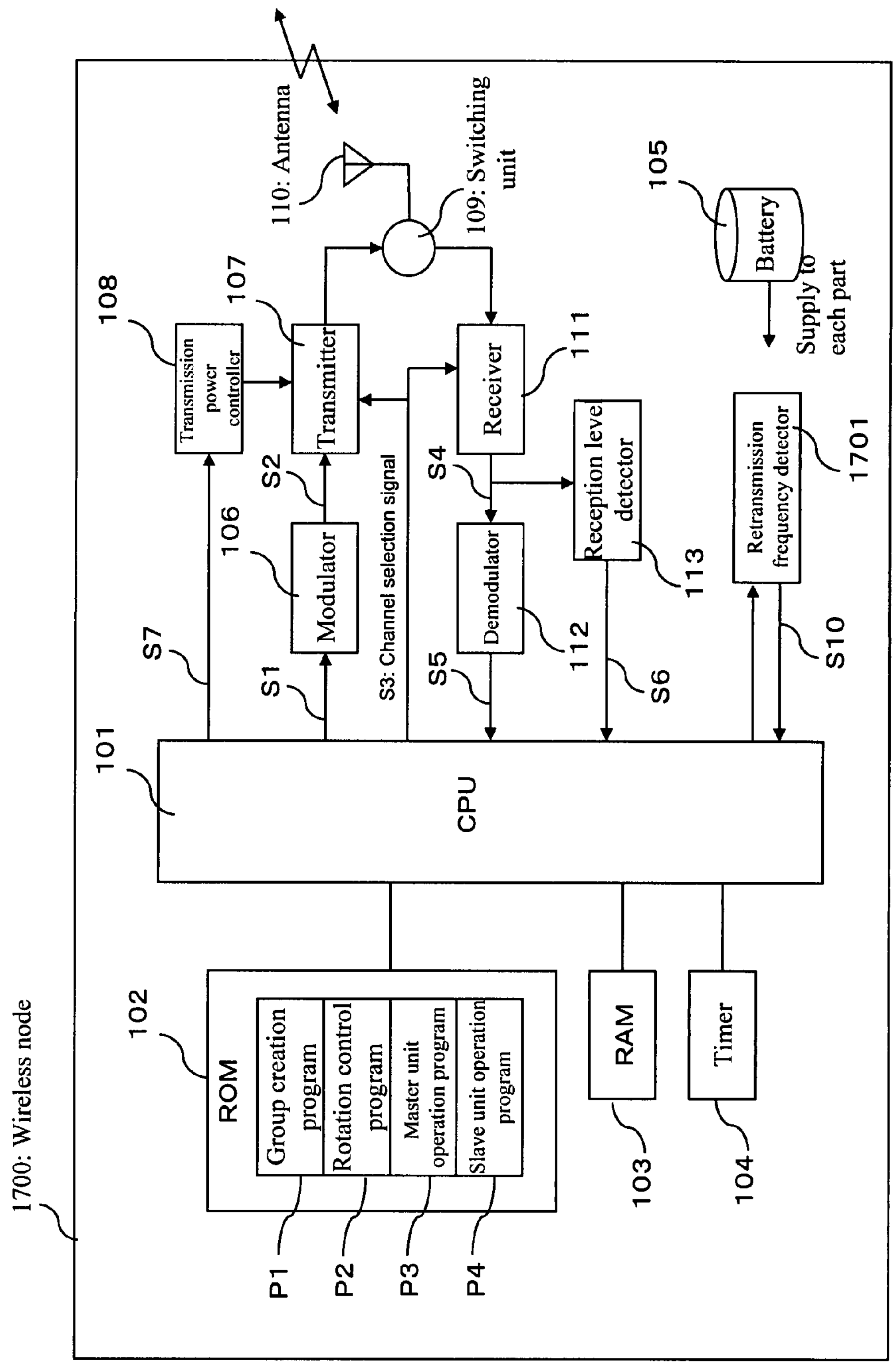
FIG. 17 is a block diagram of a wireless node in the tenth embodiment of the present invention.

FIG. 17 is a block diagram of a wireless node in the tenth embodiment of the present invention.

In FIG. 17, the same constitutional elements as in FIG. 1 (*a*) are assigned the same reference numerals, and explanation thereof is omitted.

In FIG. 17, a wireless node 1700 comprises a retransmission frequency detector 1701. The retransmission frequency detector 1701 counts, when no return data with respect to transmitted synchronization signal has been received within a prescribed time, the retransmission frequency of such data, and transmits the added up retransmission frequency information S10 to the CPU 101.

An explanation will be given with reference to the flowchart of FIG. 18 for the process of group master node rotation, using the wireless node 1700 thus configured, based on retransmission frequency.

Figure 18:
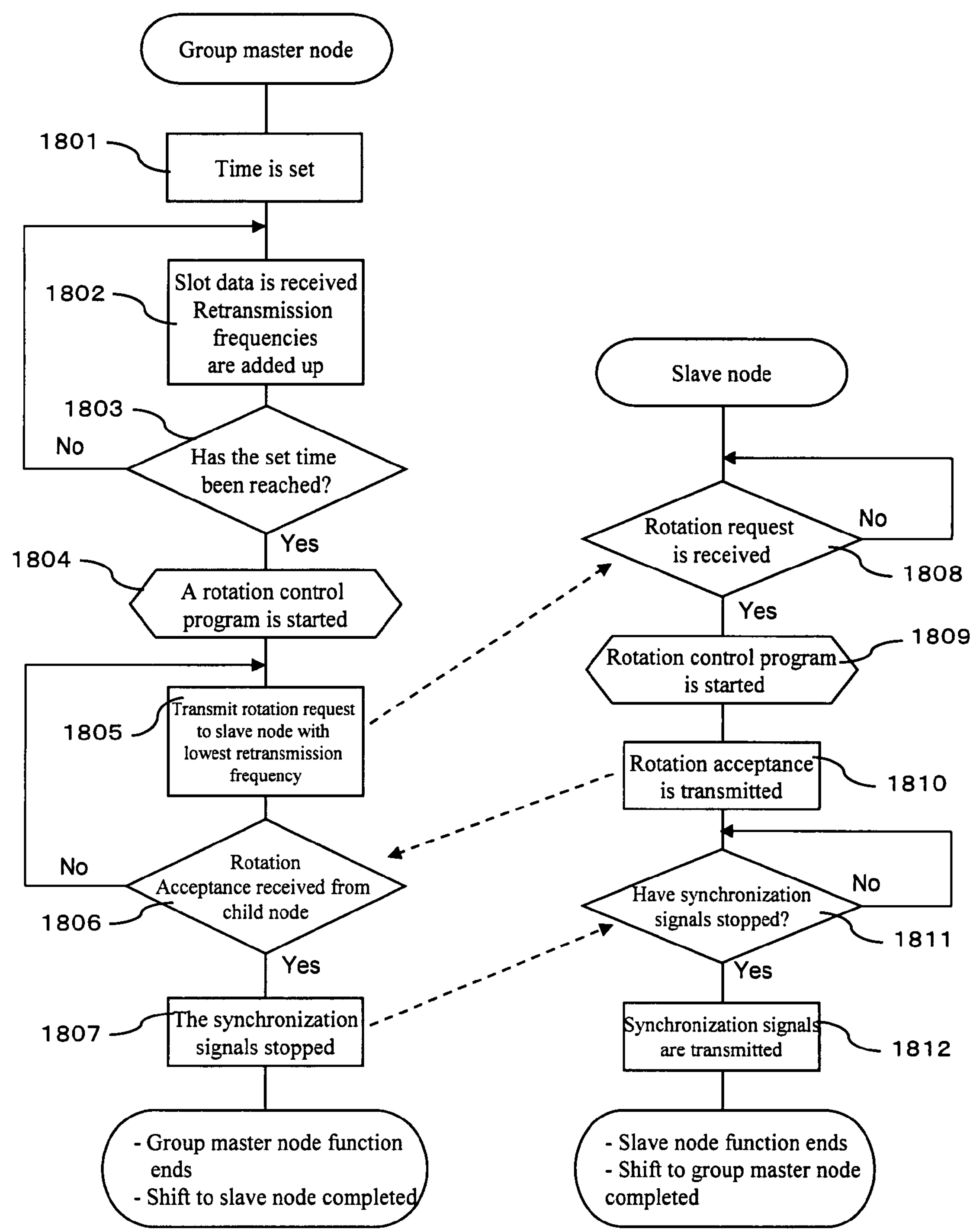
FIG. 18 is a flowchart for explaining a group master rotation operation using the retransmission frequency in the tenth embodiment of the present invention.

FIG. 18 is a flowchart for explaining a group master rotation operation using the retransmission frequency in the tenth embodiment of the present invention.

In FIG. 18, the group master node sets in advance the time that is to serve as the criterion for determining time for group master node rotation (Step 1801), receives the slot data and adds up the retransmission frequency of the slot data in communications with the slave nodes (Step 1802). Upon receiving the data of all the slots, the group master node checks whether the communication time with a slave node has reached the rotation time set in Step 1801 (Step 1803), and if the rotation time has not come, continues slot data reception, and if the rotation time of any one of the slave nodes has come, starts a rotation control program (Step 1804). At this time, because the node having the lowest retransmission frequency is assumed to have the most available battery power, a rotation request is transmitted to such slave node (Step 1805).

If it has received a rotation request (Step 1808), a slave node starts the rotation control program (Step 1809) and transmits a rotation acceptance (Step 1810).

Upon receiving the rotation acceptance from the slave node (Step 1806), the group master node stops transmitting the synchronization signals, frame header 601, and frame footer 605 (Step 1807) and ceases to function as a group master node.

Upon confirming the stop of the synchronization signals (Step 1811), the slave node starts transmitting, at the maximum transmission power and in place of the group master node, the synchronization signals, frame header 601, and frame footer 605 (Step 1812).

The above processes complete the group master rotation operation having communication retransmission frequency as rotation criterion. According to the example in FIG. 2, the group master node 204 changes to the slave node 208, and the slave node 205 changes to the group master node 207.

With such a constitution and processes, without having to detect remaining wireless node battery power, the timing of group master rotation can be accurately detected based on communication retransmission frequency, which has a high correlation with power consumption.

Eleventh Embodiment

The invention can be configured such that merging and dividing groups in an interactive wireless communication network as described in the fourth embodiment (FIG. 10) are executed with retransmission frequency of the wireless nodes as trigger. Such a case will be explained below as the eleventh embodiment.

With the eleventh embodiment, as in the tenth embodiment, a wireless node comprises a retransmission frequency detector 1701 as shown in FIG. 17. The group master node receives retransmission frequency information from the slave nodes in a group, and performs group merger and division based thereupon.

Figure 19:
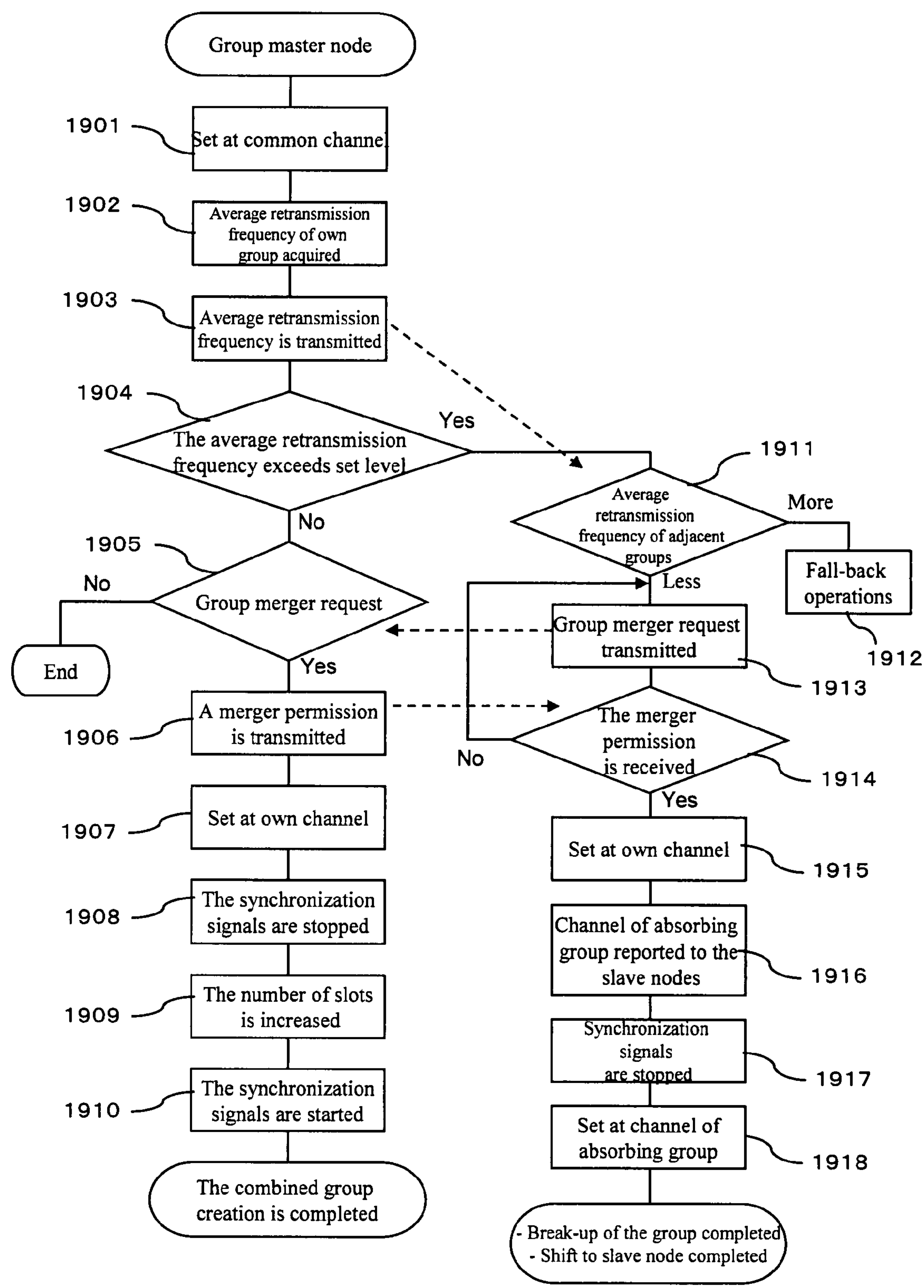
FIG. 19 is a flowchart for explaining a group merging operation in the eleventh embodiment of the present invention.

FIG. 19 is a flowchart for explaining a group merging operation in the eleventh embodiment of the present invention.

Before the process of FIG. 19, group master nodes exchange constitutional information of their own group with other groups by hopping communication so that the constitutional information of other groups, that is, group identifier, total number of wireless nodes, wireless frequency channel being used, and other such information, is shared.

First, an explanation will be given for the process of accepting group merger.

A group master node sets the wireless frequency channel at a common channel and proceeds with the process using hopping communication (Step 1901). First, it collects retransmission frequency from the slave nodes, and calculates the average retransmission frequency of its own group including its own retransmission frequency (Step 1902). Then, it transmits the average retransmission frequency calculated in Step 1902 to other group master nodes (Step 1903), and checks whether the average retransmission frequency of its own group exceeds a pre-set level (Step 1904).

If the average retransmission frequency does not exceed the set level, the group master node checks whether a group merger request has been received from another group master node (Step 1905), and if no group merger request has been received, the process ends. If a group merger request has been received, control subsequently proceeds with the merger process. In the merger process merger permission is first transmitted to the other group to indicate intent to accept merger (Step 1906). Thereafter, the group master node returns the wireless frequency back to its own channel (Step 1907), and temporarily stops the synchronization signal (Step 1908). Here, the number of necessary slots is calculated from the number of wireless nodes of its own group and other group (Step 1909), and the number of slots is increased and transmission of the synchronization signal is restarted (Step 1910).

Next, an explanation will be given for requesting group merger.

If it is found in Step 1904 that the average retransmission frequency of its own group exceeds the set level, the group master node evaluates the average retransmission frequency of adjacent groups based on the average retransmission frequency from other groups (Step 1911), and if the average retransmission frequency is at or lower than the set level, a merger request process is started, and if the average retransmission frequency exceeds the set level, because there is no adjacent group available for merger, fall-back operations are started by lowering overall performance and the like (Step 1912).

In the merger request process, a group merger request is first transmitted to the absorbing group (Step 1913), and merger permission is waited for (Step 1914). When merger permission is obtained, the group master node sets the wireless frequency back to its own channel (Step 1915), and transmits and reports to the slave nodes of its own group the wireless frequency channel of the absorbing group (Step 1916). Thereafter, the group master node stops the synchronization signal (Step 1917) and sets the channel at that of the absorbing group (Step 1918).

The above processes complete the group merging operation.

With such a constitution and processes, if there is imbalance among groups in group average retransmission frequency, a plurality of groups having a large imbalance in average retransmission frequency are merged and then divided again, thereby relieving imbalance in average retransmission frequency.

Here, two groups were merged and divided. Alternatively, more than two groups may be merged and divided. Further, an explanation was given assuming that the number of the groups to be merged and the number of groups to be divided are the same. Alternatively, depending on retransmission frequency conditions, the number of groups before merging groups and the number of groups after merging and dividing groups do not necessarily have to be the same.

Twelfth Embodiment

The invention can be configured such that the inter-group slave node exchange process as described in the FIG. 12 (fifth embodiment) is executed with retransmission frequency of the wireless nodes as trigger. Such a case will be explained below as the twelfth embodiment.

In this twelfth embodiment as well, as in the tenth embodiment, each wireless node comprises a retransmission frequency detector 1701 as shown in FIG. 17. A group master node receives retransmission frequency information from the slave nodes in the group, and carries out slave node exchange with another group based thereupon.

In FIG. 12, an interactive wireless communication network system 1200 comprises as constitutional elements a group 1201 having a group master node 1202, slave node 1203, and slave node 1204, and a group 1205 having a group master node 1206, slave node 1207, and slave node 1208 (operational state). Here, when the retransmission frequency of the slave node 1203 in the group 1201 exceeds a pre-set level, the group master node 1202 transmits a slave node exchange request to the group master node 1206. The group master node 1206 having received the exchange request makes the slave node 1207 having the lowest retransmission frequency in its own group serve as a node to be exchanged. Thereafter, the slave nodes 1203 and 1207 respectively receive a separation command from their respective own group master node, and are separated from their respective groups by stop of the synchronization signal for the slots such slave nodes use. The separated slave nodes switch their wireless frequency channel to that of the group into which they are to be exchanged, and start interactive communication based on a communication request from their new group master node (slave node exchange). Upon completing the slave node exchange, the group master nodes respectively recreate new groups 1209 and 1210 comprising the existing slave nodes and the newly exchanged slave node (group reformation). After group reformation an operational state is entered into.

With such a constitution and processes, if there is an extremely large imbalance such that imbalance in the retransmission frequency of the wireless nodes cannot be sufficiently eliminated just by intra-group group master rotation, wireless nodes are exchanged among groups, thereby eliminating such imbalance.

When a group master node has received a rotation request from another group master node, if it would become difficult to equalize the average retransmission frequency of its own group by sending out a node for exchange from its own group, it may reject the rotation request. A group master node whose rotation request has been rejected may abandon slave node exchange with such group and transmit a rotation request to another group in search of a group with which to carry out exchange, or may abandon the rotation process altogether and commence fall-back operations.

Thirteenth Embodiment

The invention can be configured such that the process for separating a slave node from a group as described in FIG. 13 (sixth embodiment) is executed with retransmission frequency as a trigger. Such a case will be explained below as the thirteenth embodiment. In this thirteenth embodiment as well, as in the tenth embodiment, each wireless node comprises a retransmission frequency detector 1701 as shown in FIG. 17. The group master node receives retransmission frequency information from the slave nodes in the group, and separates a slave node in the group based thereupon.

In FIG. 13, an interactive wireless communication network system 1300 comprises as constitutional elements a group 1301 having a group master node 1302, slave node 1303, and another slave node (operational state). Here, when the retransmission frequency of the slave node 1303 in the group 1301 exceeds a pre-set level, the group master node 1302 transmits a separation command to the slave node 1303 and then stops the synchronization signal of the slot used by such slave node (slave node separation). Upon completion of separation of the slave node 1303, the group master node 1302 recreates a group comprising only the existing slave nodes. Because it is unable to find a synchronization signal from a new group master node, the separated slave node 1303 stops transmission/reception operations, and in an idling state ends its battery life (group shrinkage). With group shrinkage an operational state is entered into.

With such a constitution and processes, if there is a wireless node with an extremely large retransmission frequency even after intra-group group master rotation, merging of groups, or inter-group wireless node exchange, such wireless node is forcibly separated from the group, thereby avoiding network problems caused by wireless node malfunction due to power exhaustion.

Fourteenth Embodiment

The invention can be configured such that the bit error rates of wireless nodes are monitored so as to perform group master node rotation based on such bit error rates. Such a case will be explained below as the fourteenth embodiment.

Figure 20:
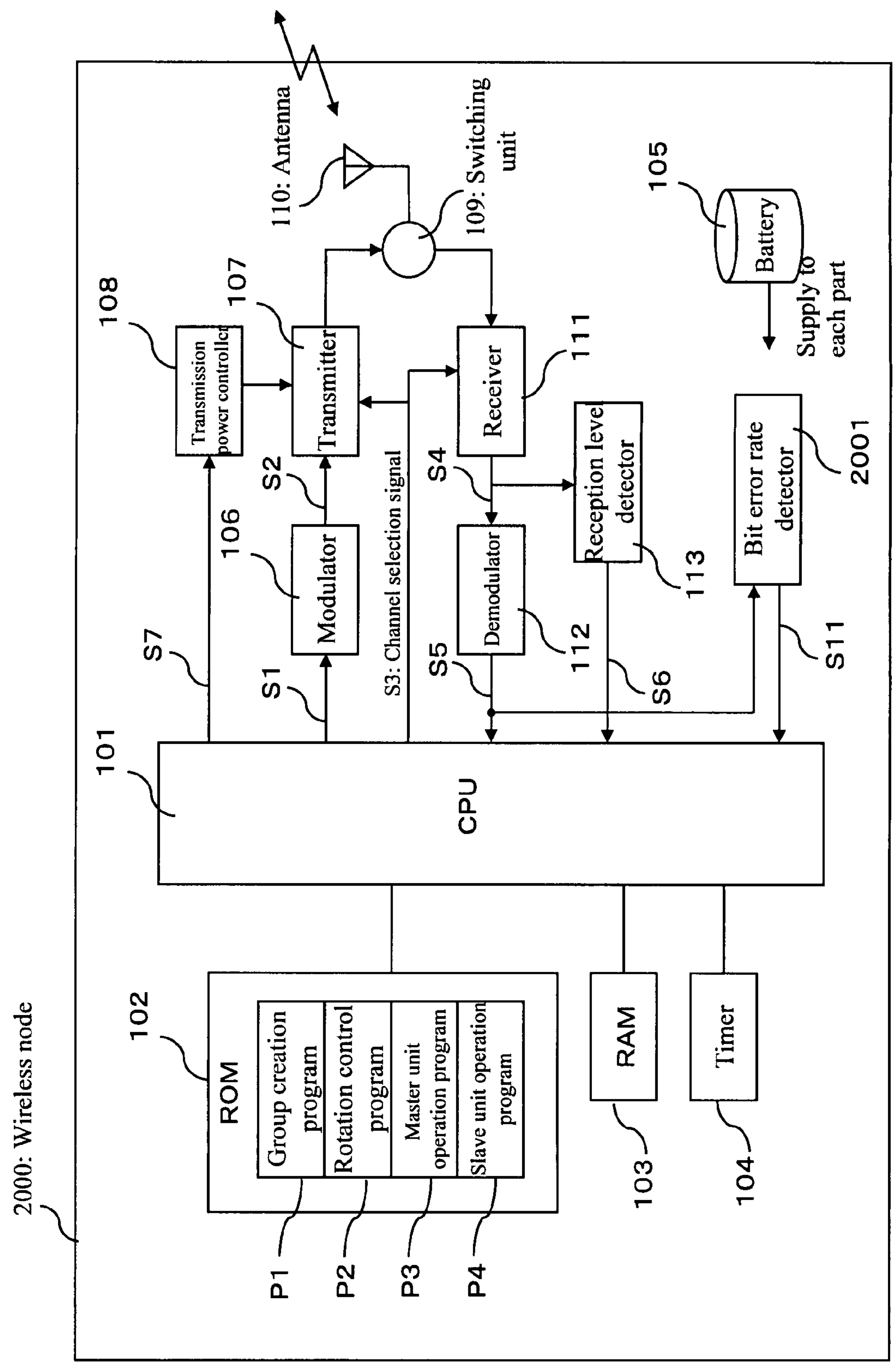
FIG. 20 is a block diagram of a wireless node in the fourteenth embodiment of the present invention.

FIG. 20 is a block diagram of a wireless node in the fourteenth embodiment of the present invention.

In FIG. 20, the same constitutional elements as in FIG. 1 (*a*) are assigned the same reference numerals, and explanation thereof is omitted.

In FIG. 20, a wireless node 2000 comprises a bit error rate detector 2001.

An explanation will be given with reference to the flowchart of FIG. 21 for the process of group master node rotation using the wireless node 2000 thus configured, based on the bit error rate.

Figure 21:
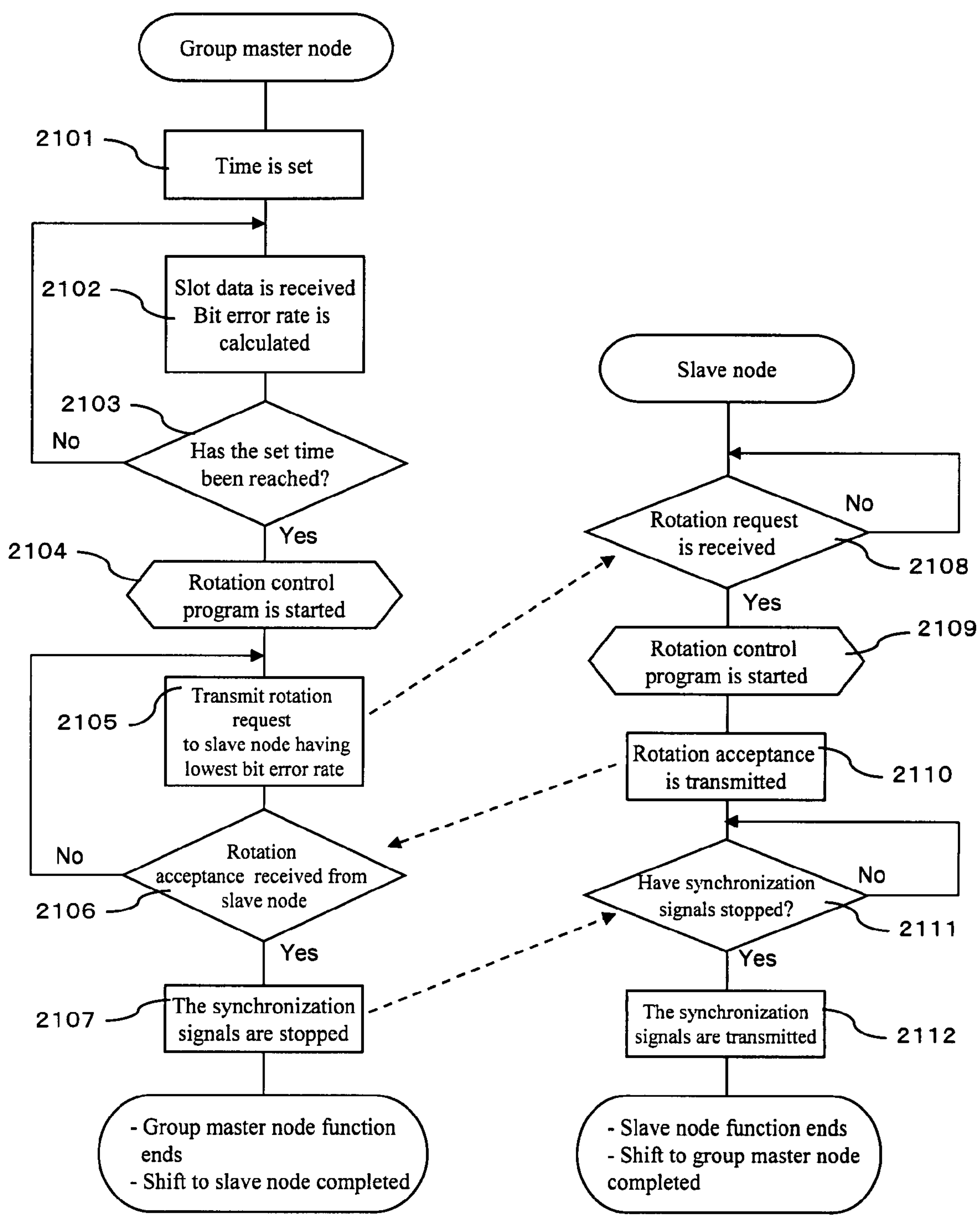
FIG. 21 is a flowchart for explaining a group merging operation using bit error rate in the fourteenth embodiment of the present invention.

FIG. 21 is a flowchart for explaining the group master rotation operation using the bit error rate in the fourteenth embodiment of the present invention.

In FIG. 21, a group master node sets in advance the time that is to serve as the criterion for determining time for group master node rotation time (Step 2101), receives slot data, and obtains the bit error rate in communications with the slave nodes (Step 2102). Upon receiving the data of all the slots, the group master node checks whether the communication time with the slave nodes has reached the rotation time set in Step 2101 (Step 2103), and if the rotation time has not come, it continues slot data reception, and if the rotation time for any of the slave nodes has come, it starts a rotation control program (Step 2104). At this time, because the slave node having the lowest bit error rate is assumed to have the most available battery power, a rotation request is transmitted to such node (Step 2105).

If it has received a rotation request (Step 2108), the slave node causes a rotation control program to start (Step 2109) and transmits a rotation acceptance (Step 2110).

Upon receiving the rotation acceptance from the slave node (Step 2106), the group master node stops transmitting the synchronization signals, frame header 601, and frame footer 605 (Step 2107) and ceases to function as a group master node.

Upon confirming the stop of the synchronization signal (Step 2111), the slave node starts transmitting, at the maximum transmission power and in place of the group master node, synchronization signals, frame header 601, and frame footer 605 (Step 2112).

The above processes complete the group master rotation operation having the bit error rate of the communication as rotation criterion. According to the example in FIG. 2, the group master node 204 changes to a slave node 208, and the slave node 205 changes to the group master node 207.

With such a constitution and processes, without having to detect wireless node battery power, the timing for the group master rotation can be accurately detected based on bit error rate, which has a high correlation with battery consumption.

The obtaining of the bit error rates in Step 2102 can be carried out by calculation at time of performing the error correction process on the received data S5 by the CPU 101 of the group master node. Moreover, the obtaining of the bit error rates can be used the error rates received from the demodulator 112 in case of using outer error correction code.

Fifteenth Embodiment

The invention can be configured so that the merging and dividing of groups in an interactive wireless communication network as described in FIG. 10 (fourth embodiment) are executed with the wireless node bit error rate serve as a trigger. Such a case will be explained below as the fifteenth embodiment.

In the fifteenth embodiment, as in the fourteenth embodiment, each wireless node comprises a bit error rate detector 2001 as shown in FIG. 20. A group master node receives bit error rate information from the slave nodes in the group, and merges and divides groups based thereupon.

Figure 22:
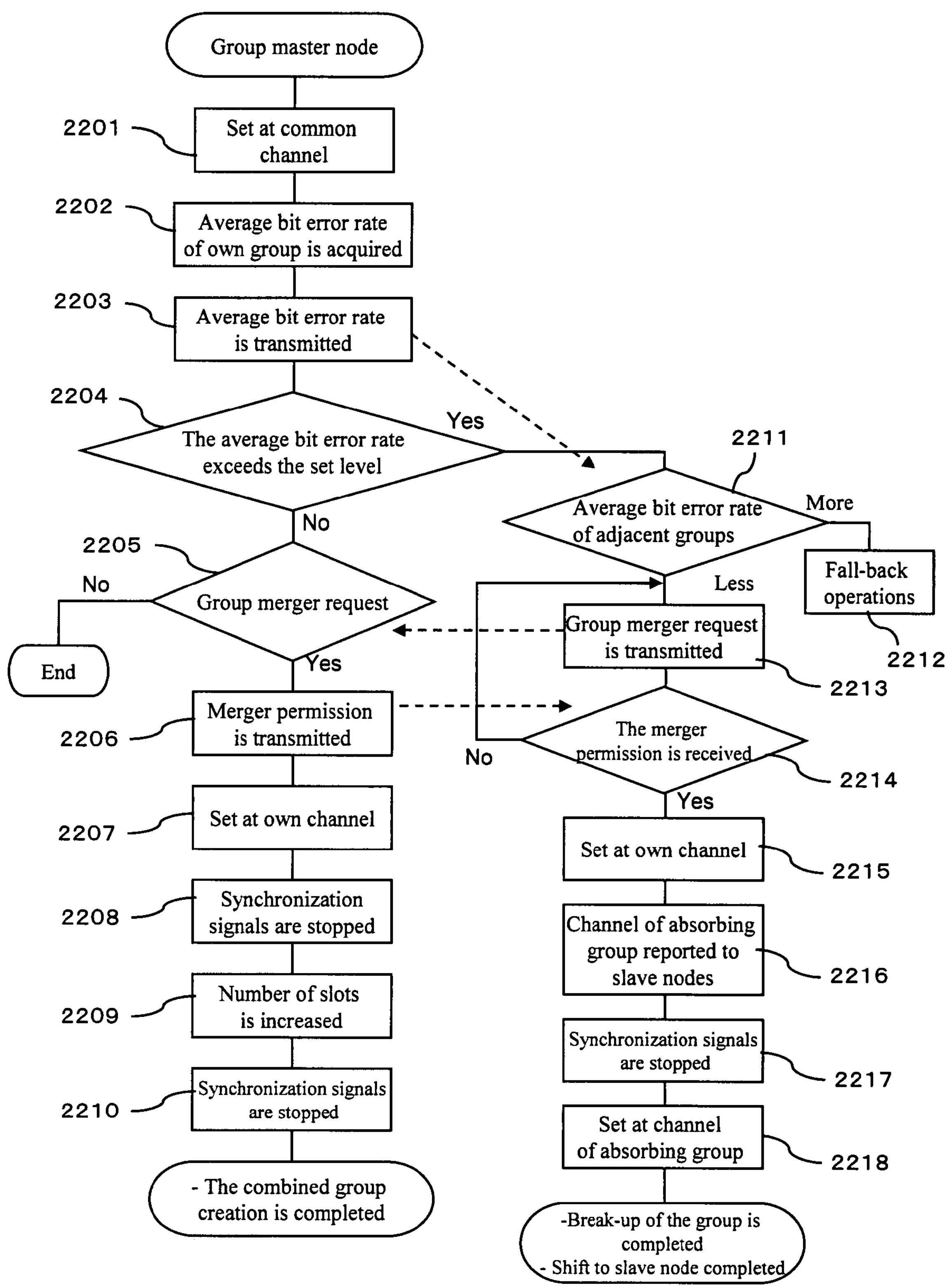
FIG. 22 is a flowchart for explaining a group merging operation in the fifteenth embodiment of the present invention.

FIG. 22 is a flowchart for explaining a group merging operation in the fifteenth embodiment of the present invention.

Before the process of FIG. 22, group master nodes exchange constitutional information of their own group with other groups by hopping communication so that the constitutional information of other groups, that is, group identifier, total number of wireless nodes, wireless frequency channel being used, and other such information is shared.

First, an explanation will be given for the process of accepting group merger.

A group master node sets the wireless frequency channel at the common channel and proceeds with the process using hopping communication (Step 2201). First, it collects bit error rates from slave nodes, and calculates the average bit error rate of its own group including its own bit error rate (Step 2202). Then, it transmits the average bit error rate calculated in Step 2202 to other group master nodes (Step 2203), and evaluates whether the average bit error rate of its own group exceeds a pre-set level (Step 2204).

If the average bit error rate does not exceed the set level, the group master node checks whether a group merger request has been received from other group master nodes (Step 2205), and if no group merger request has been received, the process ends. If a group merger request has been received, a merger process is subsequently started. In the merger process, a merger permission is first transmitted to the other group to indicate intent to accept merger (Step 2206). Thereafter, the group master node sets the wireless frequency back to its own channel (Step 2207), and temporarily stops the synchronization signal (Step 2208). The group master node calculates the necessary number of slots from the number of wireless nodes of its own group and other groups (Step 2209), increases the number of slots and restarts transmission of the synchronization signal (Step 2210).

Next, an explanation will be given for the process of requesting group merger.

If in step 2204 it is found that the average bit error rate of its own group exceeds the set level, the group master node evaluates the average bit error rate of adjacent groups based on the average bit error rate from other groups (Step 2211), and if the average bit error rate of an adjacent group is at or lower than the set level, a merger request process is started, and if the average bit error rates exceed the set level, because there is no adjacent group into which the requester can be merged, fall-back operations are started by lowering overall performance and the like (Step 2212).

In the merger request process, a group merger request is first transmitted to the absorbing group (Step 2213), and a merger permission is waited for (Step 2214). Upon obtaining the merger permission, the group master node sets the wireless frequency back to its own channel (Step 2215), and transmits and reports the wireless frequency channel of the absorbing group to the slave nodes of its own group (Step 2216). Thereafter, the group master node stops the synchronization signal (Step 2217) and set the channel to that of the absorbing group (Step 2218).

The above processes complete the group merging operation.

With such a constitution and processes, if there is imbalance among the groups in the average bit error rate of the group, a plurality of groups having large imbalance in the average bit error rate are merged and then divided again, thereby eliminating imbalance in the average bit error rate.

Here, two groups were combined and divided. Alternatively, more than two groups may be combined and divided. Further, an explanation was given assuming that the number of the groups to be combined and the number of groups to be divided are the same. Alternatively, depending on the conditions for equalization of the average bit error rate, the number of groups before merger and the number of groups after merging and dividing groups do not necessarily have to be the same.

Sixteenth Embodiment

The invention can be configured such that an inter-group slave node exchange as described in FIG. 12 (fifth embodiment) is executed with the wireless node bit error rate as trigger. Such a case will be explained below as the sixteenth embodiment.

In the sixteenth embodiment, as in the fourteenth embodiment, each wireless node comprises a bit error rate detector 2001 as shown in FIG. 20. A group master node receives bit error rate information from the slave nodes in the group, and performs slave node exchange with other groups based thereupon.

In FIG. 12, an interactive wireless communication network system 1200 comprises as constitutional elements a group 1201 having a group master node 1202, slave node 1203, and slave node 1204, and a group 1205 having a group master node 1206, slave node 1207, and slave node 1208 (operational state). Here, when the bit error rate of the slave node 1203 in the group 1201 exceeds a pre-set level, the group master node 1202 transmits a slave node exchange request to the group master node 1206. The group master node 1206, having received the exchange request, makes the slave node 1207 having the lowest bit error rate in its own group be the node to be exchanged. Thereafter, the slave nodes 1203 and 1207 to be exchanged respectively receive a separation command from the group master node of their respective own group, and are separated from their respective groups by stop of the synchronization signal for the slots such slave nodes use. The separated slave nodes switch their wireless frequency channel to that of the group into which they are to be exchanged, and start interactive communication based on a communication request from the new group master node (slave node exchange). Upon completing the slave node exchange, the group master nodes respectively recreate new groups 1209 and 1210 comprising the existing slave nodes and newly exchanged slave node (group reformation). After group reformation an operational state is entered into.

With such a constitution and processes, if there is an extreme imbalance in bit error rate such that imbalance in wireless node bit error rate cannot be sufficiently eliminated just by intra-group group master rotation, wireless node exchange is carried out with another group, thereby eliminating such imbalance.

When a group master node has received a rotation request from another group master node, if it would become difficult to equalize the average bit error rate of its own group by sending out a node to be exchanged from its own group, it may reject the rotation request. The group master whose rotation request has been rejected may abandon slave node exchange with such group and transmit a rotation request to another group in search of a group with which carry out exchange, or may abandon the rotation process altogether and commence fall-back operations.

Seventeenth Embodiment

The invention can be configured such that the process of separating a slave node from a group as described in FIG. 13 (sixth embodiment) is executed with bit error rate as trigger. Such a case will be explained below as the seventeenth embodiment. This seventeenth embodiment is configured such that, as in the fourteenth embodiment, each wireless node comprises a bit error rate detector 2001 as shown in FIG. 20. A group master node receives bit error rate information from the slave nodes in the group, and separates a slave node from the group based thereupon.

In FIG. 13, an interactive wireless communication network system 1300 comprises as constitutional elements a group 1301 having a group master node 1302, slave node 1303, and another slave node (operational state). Here, when the bit error rate of the slave node 1303 in the group 1301 exceeds a pre-set level, the group master node 1302 transmits a separation command to the slave node 1303 and thereafter stops the synchronization signal for the slot used by such slave node (slave node separation). Upon completing separation of the slave node 1303, the group master node 1302 recreates a group comprising only the existing slave nodes. Because it is unable to find a synchronization signal from a new group master node, the separated slave node 1303 stops transmission/reception operations, and in an idling state ends its battery life (group shrinkage). With group shrinkage an operational state is entered into.

With such a constitution and processes, if there is a wireless node having an extremely large bit error rate even after intra-group group master rotation, merging of groups, or inter-group wireless node exchange, such wireless node is forcibly separated from the group, thereby avoiding network problems caused by wireless node malfunction due to power exhaustion.

By using a wireless node thus configured, a sensor network system having a topology as shown in the interactive wireless communication network system 200 of FIG. 2 can be easily created. In particular, with the present invention, because an ad-hoc network system can be automatically and independently configured using the wireless nodes, a wide area network system can be easily realized without requiring expensive installation costs, and because operation is performed under power source management in which all of the wireless nodes are equalized, a long-life, reliable network system can be provided.

Figure 23A:
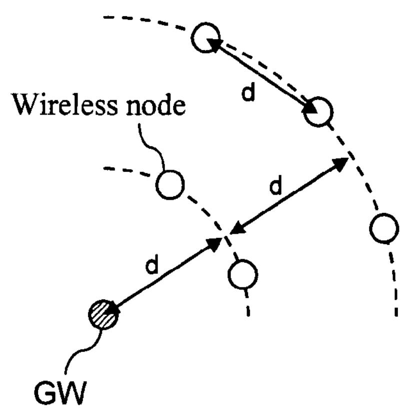
FIG. 23 (*a*) is a diagram for explaining a topology simulation model of the present invention.
Figure 23B:
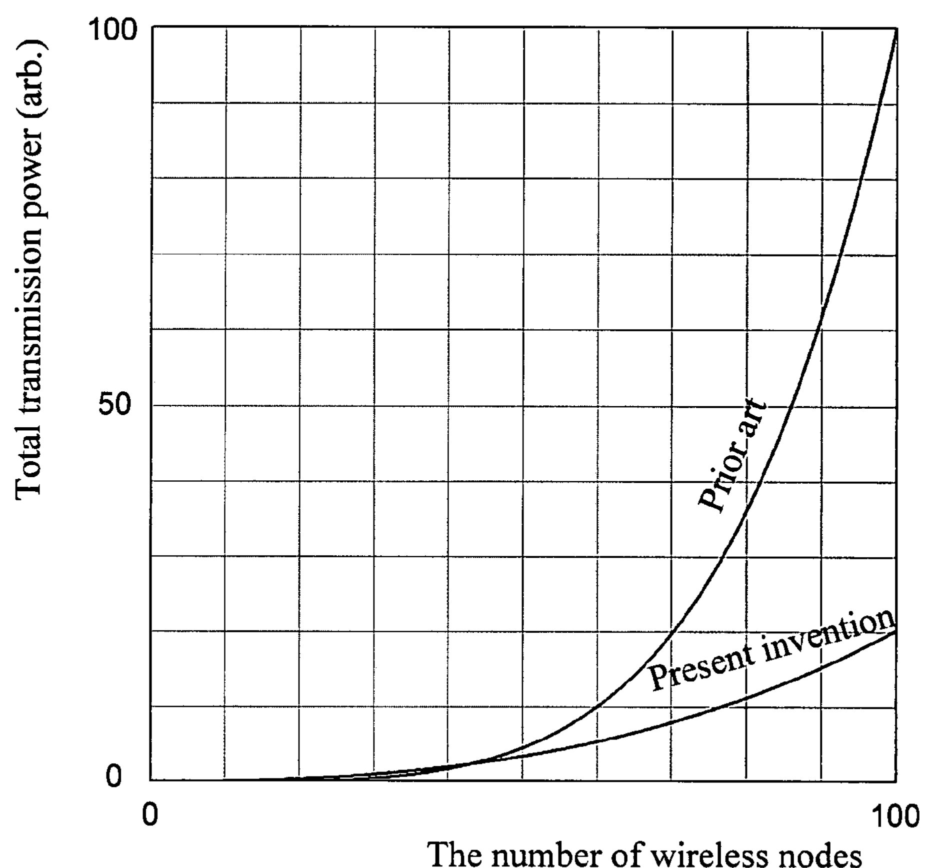
Figure 24:
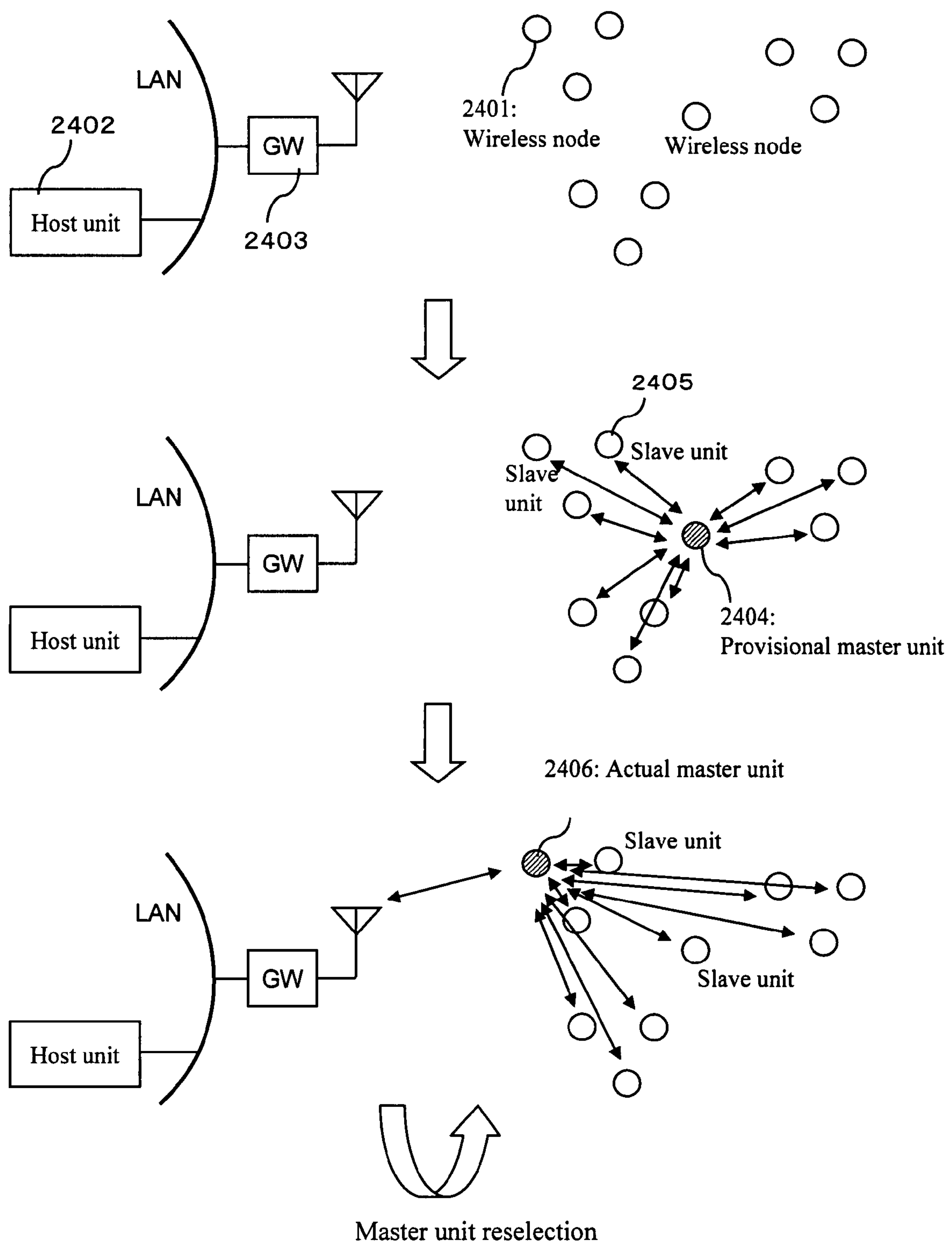
FIG. 24 is a constitutional diagram of a conventional power management method of wireless nodes.

In order to simulate the topology effects using the power management method relating to the present invention, a model is used such that, with the gateway GW (a) as the center, wireless nodes are disposed equidistantly at a distance of d on concentric circles the radii of which increase in increments of d shown in FIG. 23.

At this time, the number of wireless nodes existing on a circle having the radius r from the gateway GW is 2πr. Because the transmission power P necessary for a wireless communication is in proportion to the cube of the distance between communication stations, $$P=(\text{number of wireless nodes})*(\text{cube of the distance})*2.$$

The reason for multiplication by 2 in this formula is that one session is comprised of ENQ/ACK interactive communication.

Conventionally, because wireless nodes perform communications with the gateway GW, the necessary power $P_0$ conventionally is $$P_0 = 2\times\sum_{r=1}^{n} 2\pi r\cdot r^3 = \frac{2\pi}{15}n(n+1)(2n+1)(3n^2+3n-1)$$

The present invention is configured so that wireless nodes are divided into a plurality of groups, piconet communications are performed in the group, and inter-group ad-hoc hopping communications are performed to reach the gateway GW. Therefore, necessary power $P_1$ for the present invention is $P_1$=(necessary power for piconet communication)+(necessary power for hopping communication)

and necessary power for piconet communication $P_p$ can be represented by $$P_p = 2\times\sum_{r=1}^{n} 2\pi r d^3 = 2\pi n(n+1)$$

d is the distance between the wireless nodes, and is normalized at 1. Further, because the hopping interval between the wireless nodes disposed closely at distance d is approximated to 3d, the number of hoppings to the gateway GW is r/3.

Further, at least two sessions are required because of the synchronization process at time of ad-hoc hopping.

Further, if the number of groups is g, and the number of wireless nodes in the group is m, g=2πr/m. Therefore, the necessary power for a hopping communication $P_h$ can be represented by $$P_h = 4\times\sum_{r=1}^{n} g(3d)^3\frac{r}{3} = \frac{72\pi}{m}\sum_{r=1}^{n} r^2 = \frac{12}{m}\pi n(n+1)(2n+1)$$

If we assume a model of m=5 where a group comprises four slave nodes and one group master node, the necessary power $P_1$ of the present invention is $$P_1 = 2\pi n(n+1) + \frac{12}{5}\pi n(n+1)(2n+1)$$

Such simulation results are shown in FIG. 23 (*b*). As shown in FIG. 23 (*b*), when the number of the wireless nodes increases, in the conventional art, the total power greatly increases, whereas with the present invention, the total transmission power can be kept low.

In the above described embodiments, the frame header 601 in the frame 600 comprises an identifier unique to a group master node, each synchronization signal comprises an identifier designating a slave node corresponding to such synchronization signal, and each slot data comprises an identifier indicating the slave node number of the transmitter. Such identifiers may be a unique mechanical number included in each wireless node, or may be a free name allocated for each wireless node. In case of using free names, the network system may comprise a name solution node or name solution server that correlates the free name of a wireless node and its unique mechanical number.

Further, in the above embodiments, when data is transmitted through an antenna transmission channel, if data is transmitted after an interleave process and error correcting coding process are performed as outer coding processes, communication reliability improves. At this time, for the outer encoding process it is preferable that the encoding process be provided at the stage of input into a modulator 106, and the decoding process at the stage of output from the demodulator 112. Further, if error correction codes to be used have effective properties with respect to a consecutive coding error such as convolution codes, turbo codes and the like, communication reliability further improves.

INDUSTRIAL APPLICABILITY

The power management method for wireless nodes according to the present invention can be used as power management means for extending battery life of wireless nodes that are battery-driven wireless terminals constituting an interactive wireless network system, evenly across an entire network. Further, the present invention is also applicable for use in a sensor network system and the like using wireless ad-hoc communications.

The invention claimed is:

1. A power management method for managing power consumption of batteries that serve as a power source for wireless nodes in an interactive wireless communication network system including a plurality of wireless nodes, the power management method comprising:

a step of constructing a plurality of groups using a plurality of wireless nodes during construction of a network;

a step of provisionally deciding, from among the wireless nodes in each group, a group master node serving as a group master that communicates with the other wireless nodes in the group and that functions as a communication relay station for communicating with the other groups, with the other wireless nodes in the group serving as slave nodes that are connected under the control of the group master node to perform their respective terminal station operation;

a step in which the wireless nodes in each group exchange data with each other at a commencement session and calculate a minimum required transmission power for each other;

a step in which the wireless nodes in each group use the calculated minimum required transmission powers to communicate with each other;

a step for causing the group master node to monitor volume of communication traffic in communications with the slave nodes in the group; and a step for causing the slave node having the smallest volume of communication traffic to take over as the group master, when it is determined that the volume of communication traffic of the group master node has reached a pre-set communication traffic volume.

2. A power management method for managing power consumption of batteries that serve as a power source for wireless nodes in an interactive wireless communication network system including a plurality of wireless nodes, the power management method comprising:

a step of constructing a plurality of groups using a plurality of wireless nodes during construction of a network;

a step of provisionally deciding, from among the wireless nodes in each group, a group master node serving as a group master that communicates with the other wireless nodes in the group and that functions as a communication relay station for communicating with the other groups, with the other wireless nodes in the group serving as slave nodes that are connected under the control of the group master node to perform their respective terminal station operation;

a step in which the wireless nodes in each group exchange data with each other at a commencement session and calculate a minimum required transmission power for each other;

a step in which the wireless nodes in each group use the calculated minimum required transmission powers to communicate with each other;

a step for causing the slave nodes to monitor their own communication traffic volumes and report the communication traffic volumes to the group master node;

a step for causing the slave node having the smallest communication traffic volume to take over as the group master, when a prescribed time has passed since a current group master node started as the group master;

a step for causing the group master node to calculate an average communication traffic volume of the wireless nodes in the group and exchange average communication traffic volume information with other group masters;

a step for absorbing and merging a group in which the average communication traffic volume exceeds a pre-set level into an adjacent group having the smallest average communication traffic volume; and a step for dividing the group, after group absorption and merger, so that each of the divided groups' average communication traffic volume is equalized.

3. The power management method according to claim 2, further comprising:

a step for causing the group master node to exchange the slave node having the greatest communication traffic volume in the group with the wireless node in the adjacent group having the smallest communication traffic volume.

4. A power management method for managing power consumption of batteries that serve as a power source for wireless nodes in an interactive wireless communication network system including a plurality of wireless nodes, the power management method comprising:

a step of constructing a plurality of groups using a plurality of wireless nodes during construction of a network;

a step of provisionally deciding, from among the wireless nodes in each group, a group master node serving as a group master that communicates with the other wireless nodes in the group and that functions as a communication relay station for communicating with the other groups, with the other wireless nodes in the group serving as slave nodes that are connected under the control of the group master node to perform their respective terminal station operation;

a step in which the wireless nodes in each group exchange data with each other at a commencement session and calculate a minimum required transmission power for each other;

a step in which the wireless nodes in each group use the calculated minimum required transmission powers to communicate with each other;

a step for causing each slave node to monitor its own battery power and report the battery power to the group master node;

a step for causing the slave node having the greatest remaining battery power to take over as the group master, when a prescribed time has passed since a current group master node started as the group master;

a step for causing the group master node to calculate an average remaining battery power of the wireless nodes in the group and exchange average remaining battery power information with other group masters;

a step for absorbing and merging a group in which the average remaining battery power is lower than a pre-set level into an adjacent group having the greatest average remaining battery power; and a step for dividing the group, after group absorption and merger, so that each of the divided groups' average remaining battery power is equalized.

5. The power management method according to claim 4, further comprising:

a step for causing the group master node to exchange the slave node having the lowest remaining battery power in the group with the wireless node having the greatest remaining battery power in the adjacent group.

6. The power management method according to claim 4 further comprising:

a step for separating the slave node having the lowest remaining battery power from the group, if the battery power of the slave node having the lowest remaining battery power in the group is lower than a pre-set level.

7. A power management method for managing power consumption of batteries that serve as a power source for wireless nodes in an interactive wireless communication network system including a plurality of wireless nodes, the power management method comprising:

a step of constructing a plurality of groups using a plurality of wireless nodes during construction of a network;

a step of provisionally deciding, from among the wireless nodes in each group, a group master node serving as a group master that communicates with the other wireless nodes in the group and that functions as a communication relay station for communicating with the other groups, with the other wireless nodes in the group serving as slave nodes that are connected under the control of the group master node to perform their respective terminal station operation;

a step in which the wireless nodes in each group exchange data with each other at a commencement session and calculate a minimum required transmission power for each other;

a step in which the wireless nodes in each group use the calculated minimum required transmission powers to communicate with each other;

a step for causing the group master node to monitor a retransmission frequency occurring in communications with each slave node;

a step for causing the slave node having the lowest retransmission frequency to take over as the group master, when a prescribed time has passed since a current group master node started as the group master;

a step for causing the group master node to calculate an average retransmission frequency occurring in communications with each wireless node in the group and to exchange average retransmission frequency information with other group masters;

a step for absorbing and merging a group in which the average retransmission frequency exceeds a pre-set level into an adjacent group having the lowest average retransmission frequency; and a step for dividing the group, after group absorption and merger, so that each of the divided groups' average retransmission frequency is equalized.

8. The power management method according to claim 7, further comprising:

a step for causing the group master node to exchange the slave node having the greatest retransmission frequency in the group with the wireless node in the adjacent group having the lowest retransmission frequency.

9. The power management method according to claim 7, further comprising:

a step for separating the slave node having the greatest retransmission frequency from the group, when the retransmission frequency of the slave node having the greatest retransmission frequency in the group exceeds a pre-set level.

10. A power management method for managing power consumption of batteries that serve as a power source for wireless nodes in an interactive wireless communication network system including a plurality of wireless nodes, the power management method comprising:

a step of constructing a plurality of groups using a plurality of wireless nodes during construction of a network;

a step of provisionally deciding, from among the wireless nodes in each group, a group master node serving as a group master that communicates with the other wireless nodes in the group and that functions as a communication relay station for communicating with the other groups, with the other wireless nodes in the group serving as slave nodes that are connected under the control of the group master node to perform their respective terminal station operation;

a step in which the wireless nodes in each group exchange data with each other at a commencement session and calculate a minimum required transmission power for each other;

a step in which the wireless nodes in each group use the calculated minimum required transmission powers to communicate with each other;

a step for causing the group master node to monitor a bit error rate occurring in communications with each slave node;

a step for causing the slave node having the lowest bit error rate to take over as the group master, when a prescribed time has passed since a current group master node started as the group master;

a step for causing the group master node to calculate an average bit error rate occurring in communications with each wireless node in the group and to exchange average bit error rate information with other group masters;

a step for absorbing and merging a group in which the average bit error rate exceeds a pre-set level into an adjacent group having the lowest average bit error rate; and a step for dividing the group, after group absorption and merger, so that each of the divided groups' average bit error rate is equalized.

11. The power management method according to claim 10, further comprising:

a step for causing the group master node to exchange the slave node having the greatest bit error rate in the group with the wireless node in the adjacent group having the lowest bit error rate.

12. The power management method according to claim 10, further comprising:

a step for separating the slave node having the greatest bit error rate from the group, when the bit error rate of the slave node having the greatest bit error rate in the group exceeds a pre-set value.

13. A power management device for managing power consumption of a batteries serving as a power source for wireless nodes in an interactive wireless communication network system including a plurality of wireless nodes, the power management device comprising:

a group creation unit causing a wireless node to belong to any one of a plurality of groups comprising a plurality of wireless nodes formed at a time of network creation and communicate with other wireless nodes in the group, and in a case where in its own group there is no group master node for performing the role of a group master that serves as a communication relay station for communicating with the other wireless nodes in the group, to serve as a provisional group master node, and in a case where there is a group master in its own group, to serve as a slave node connected under the group master node and operate as a terminal station;

a master unit operation unit for, in the case where the wireless node serves as the group master node, communicating with the other slave nodes in the group, serving as a communication relay station for communicating with the other groups, and monitoring volume of communication traffic in communications with the slave nodes in the group;

a rotation controller for, in the case where the wireless node serves as the group master node, determining at prescribed intervals whether a time for group master rotation has come, and performing a rotation request for group master role rotation to the slave node having the smallest volume of communication traffic, when it is determined that the volume of communication traffic of the group master node has reached a pre-set communication traffic volume; and a slave unit operation unit for, in the case where the wireless node serves as a slave node, transmitting, to the group master of its own group, information necessary for determining whether the time for group master rotation has come, and for receiving a rotation request from the group master node and shifting operation to the master unit operation unit.

14. A non-transitory computer-readable recording medium on which a program for is recorded, the program for managing power consumption of batteries that serve as a power source for wireless nodes in an interactive wireless communication network system comprising a plurality of wireless nodes, the program causing a computer to execute steps comprising:

a step of using a plurality of wireless nodes to construct a plurality of groups during construction of a network;

a step of provisionally deciding, from among the wireless nodes in each group, a group master node serving as a group master that communicates with the other wireless nodes in the group and that functions as a communication relay station for communicating with the other groups, with the other wireless nodes in the group serving as slave nodes that are connected under the control of the group master node to perform their respective terminal station operation;

a step in which the wireless nodes in each group exchange data with each other at a commencement session and calculate a minimum required transmission power for each other;

a step in which the wireless nodes in each group use the calculated minimum required transmission powers to communicate with each other;

a step for causing the group master node to monitor volume of communication traffic in communications with the slave nodes in the group; and a step for causing the slave node having the smallest volume of communication traffic to take over as the group master, when it is determined that the volume of communication traffic of the group master node has reached a pre-set communication traffic volume.

* * * * *